United States Patent [19]

Kumagai et al.

[11] 4,170,259
[45] Oct. 9, 1979

[54] AIR CONDITIONING DISPLAY SYSTEM FOR VEHICLES

[75] Inventors: Naotake Kumagai, Aichiken; Minoru Tatemoto, Ohbu, both of Japan

[73] Assignee: Mitsubishi Jidosha Kogyo Kabushiki Kaisha, Tokyo, Japan

[21] Appl. No.: 882,144

[22] Filed: Feb. 28, 1978

[30] Foreign Application Priority Data

Mar. 23, 1977 [JP] Japan .................................. 52-31117
Jan. 17, 1978 [JP] Japan .................................... 53-3453

[51] Int. Cl.² ........................ B60H 1/00; B60Q 11/00; G08B 5/36
[52] U.S. Cl. ...................................... 165/11; 62/126; 73/432 AD; 165/43; 236/94; 237/12.3 B; 340/52 F; 340/525
[58] Field of Search ............... 165/11, 42, 43; 62/126; 236/94; 340/52 F, 79, 286 M, 524, 525; 73/432 AD; 123/41.15; 237/12.3 B

[56] References Cited

U.S. PATENT DOCUMENTS

| | | | |
|---|---|---|---|
| 3,626,370 | 12/1971 | Stubbs | 340/524 X |
| 3,939,456 | 2/1976 | Curtis | 236/94 X |
| 4,016,534 | 4/1977 | Kobayashi et al. | 340/52 F |
| 4,025,896 | 5/1977 | Hintze et al. | 340/79 X |
| 4,035,764 | 7/1977 | Fujinami et al. | 340/52 F |
| 4,038,061 | 7/1977 | Anderson et al. | 62/126 |
| 4,109,235 | 8/1978 | Bouthors | 340/52 F |

Primary Examiner—Albert W. Davis, Jr.
Assistant Examiner—Margaret A. Focarino
Attorney, Agent, or Firm—Oldham, Oldham, Hudak & Weber Co.

[57] ABSTRACT

An air conditioning display system for a vehicle comprising a vehicle's air conditioner proper including a plurality of air intake ducts, a plurality of air discharge ducts, a plurality of dampers, and a fan unit, an air conditioner actuator actuating the dampers and the fan unit thereby regulating a temperature of air discharged out of the discharge duct, and a display device including a display panel carrying the picture of the vehicle body portions including the front seat, front glass and bonnet for displaying the flowing patterns of air into and out of the air conditioner proper. Lamps emitting light of warm color and cold color are disposed behind the display panel and are selectively energized by a plurality of switch means so that the occupant can readily visually confirm the flow of warm air or cold air from the duct outlets and also the flowing directions of air.

33 Claims, 34 Drawing Figures

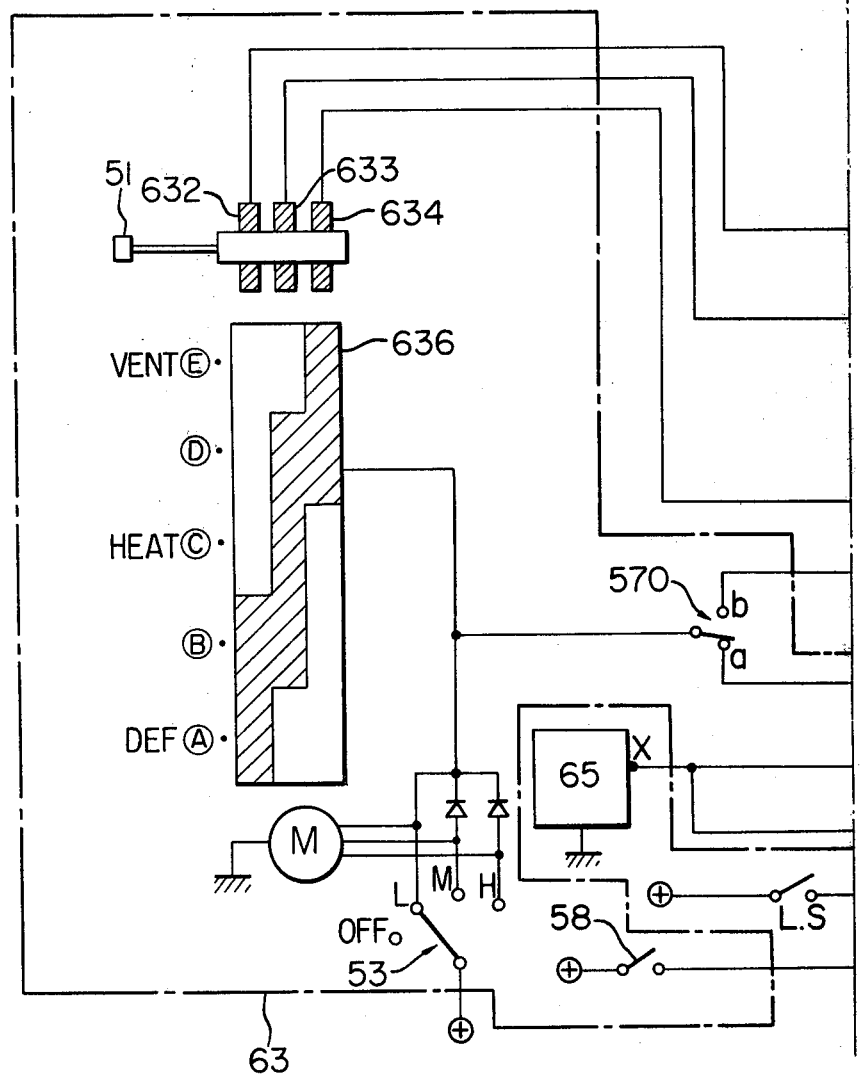

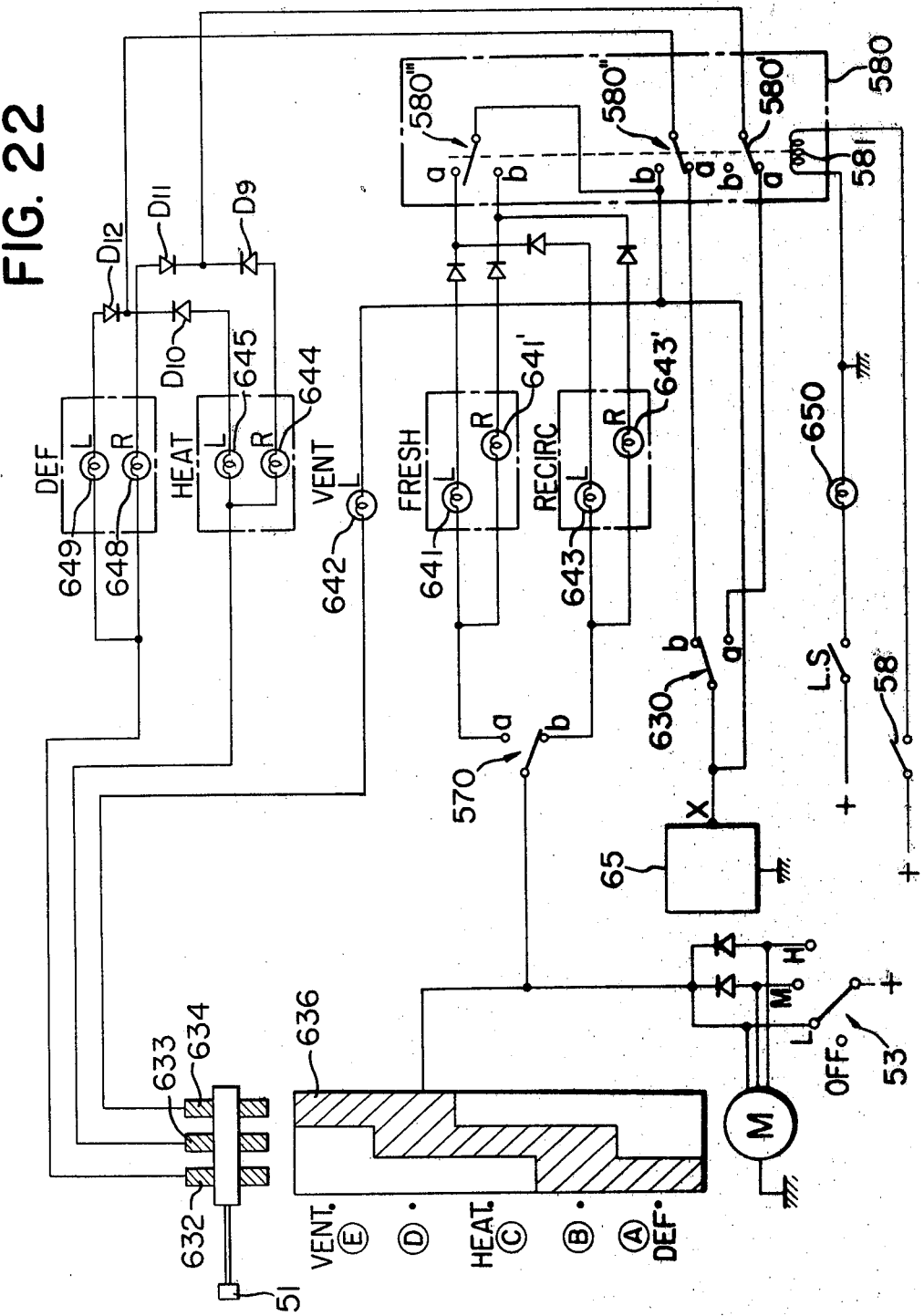

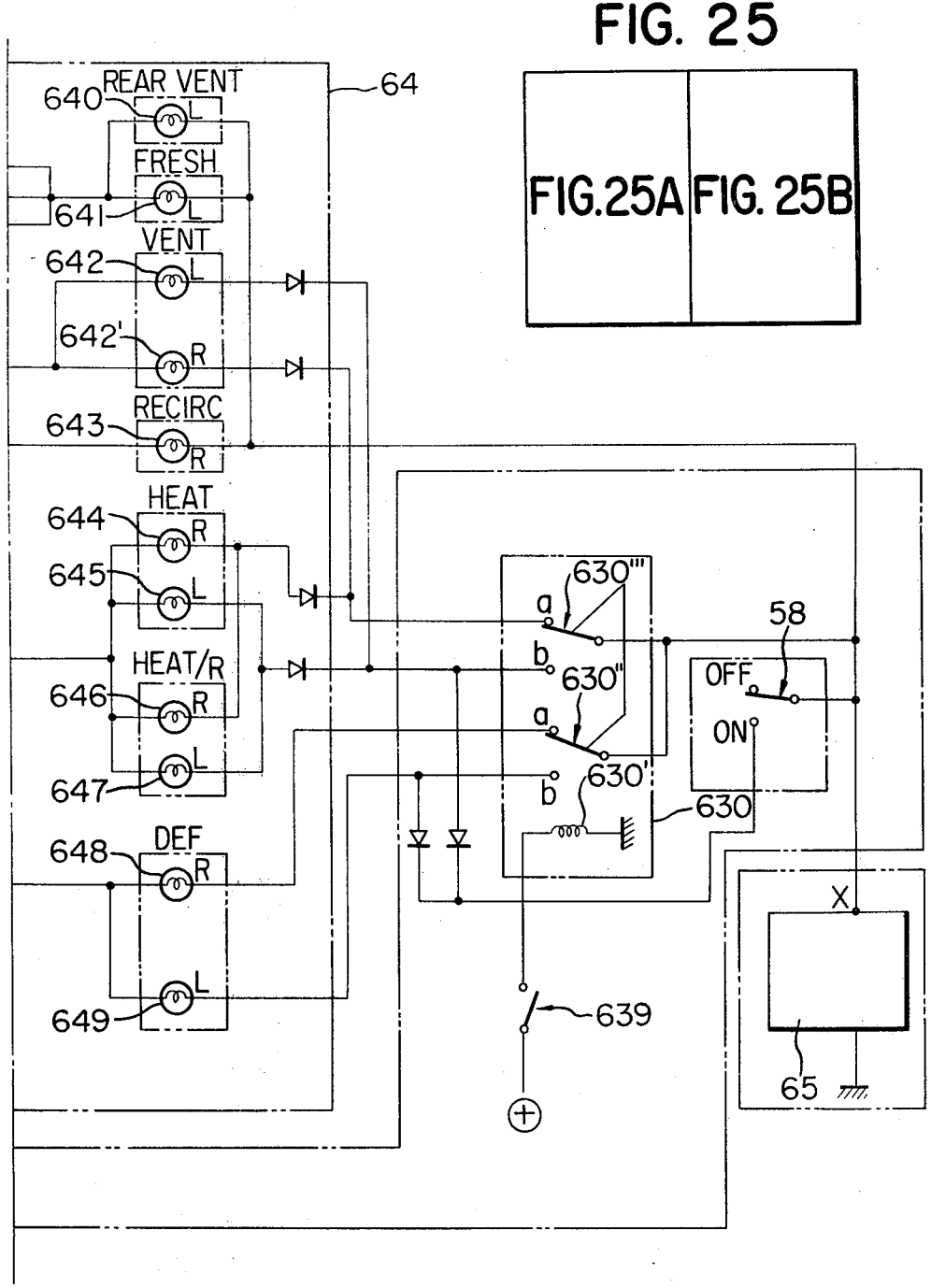

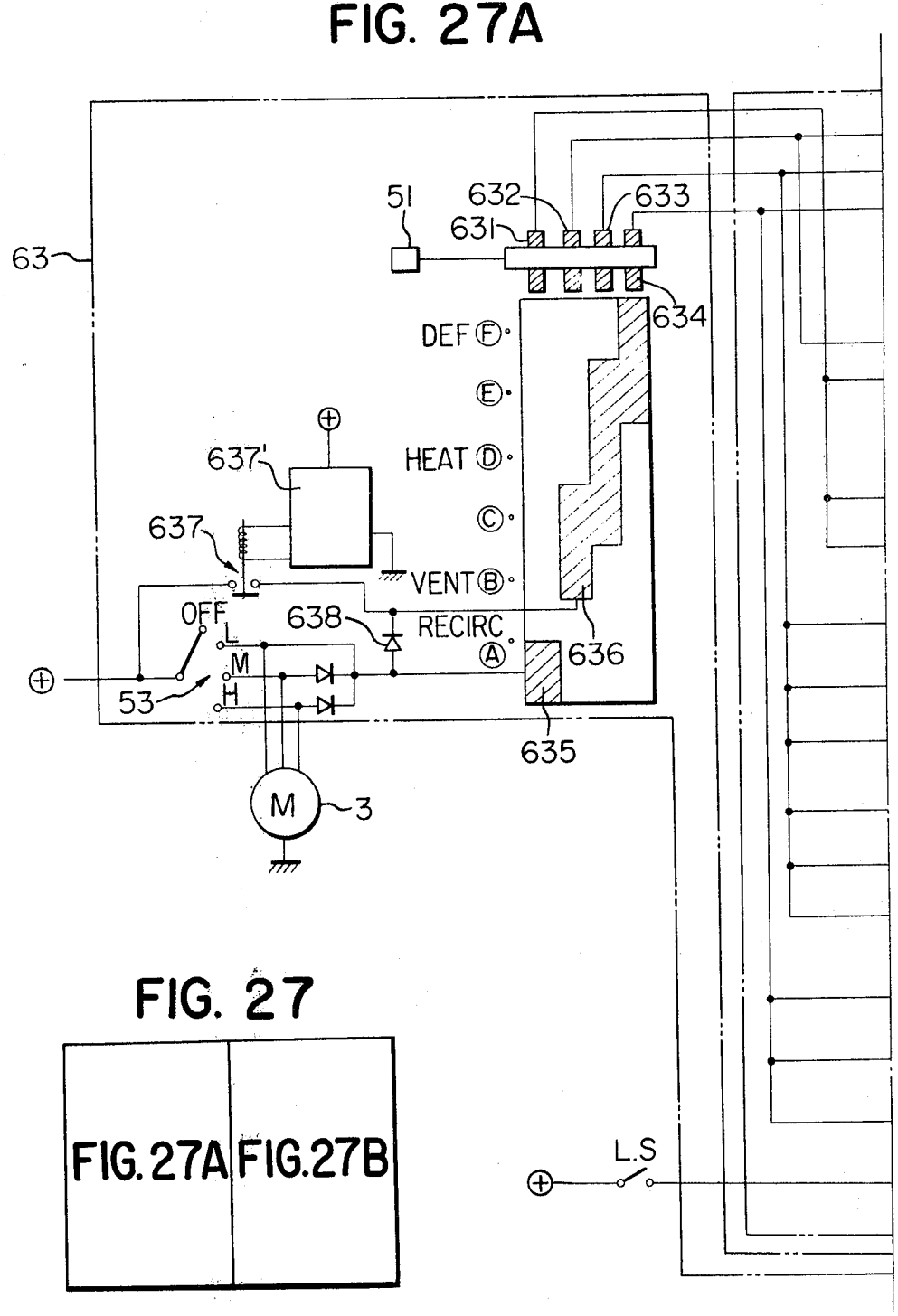

AIR CONDITIONING DISPLAY SYSTEM FOR VEHICLES

BACKGROUND OF THE INVENTION

This invention relates to an air conditioning display system which operates in interlocking relation with an actuator for an air conditioner used in an automotive vehicle or the like and pictorially displays the directions of air flow, presence or absence of air flow and air temperatures on a display panel so that an occupant manipulating the air conditioner actuator can readily know the operating state of the air conditioner by merely looking at the display panel.

In a conventional display system for displaying the operation of an air conditioner for a vehicle or the like, pilot lamps or abbreviated letters such as "VENT" and "DEF" have been merely provided on or adjacent to the actuator panel to display the operating state of the air conditioner. However, with such manner of display, the occupant manipulating the air conditioner actuator has been unable to visually confirm the presence or absence of air flow from a specific duct outlet and the temperature of air discharged from such an outlet. Further, the prior art of air conditioning display using merely the pilot lamps and abbreviated letters such as "VENT" and "DEF" has been quite inconvenient for the user since he cannot readily identify the location of the duct outlet from which air is flowing out now. For the conveniences of the user, the air conditioner instruction manual has described how to use the air conditioner in detail over many pages.

SUMMARY OF THE INVENTION

With a view to obviate such prior art inconveniences, it is a primary object of the present invention to provide a novel air conditioning display system for a vehicle, in which the flowing patterns of air into and out of a plurality of ducts controlled by a plurality of dampers in a vehicle's air conditioner are pictorially displayed on a display panel in a form to be readily visually identified by the user, and a plurality of lamps turned on and off in interlocking relation with the manipulation of a changeover lever of an air conditioner actuator are used to viewably display the directions of air flow into and out of the ducts, presence or absence of such air flow and air temperatures at the duct inlets and outlets.

BRIEF DESCRIPTION OF THE DRAWINGS

This invention will be explained by way of example with reference to the accompanying drawings in which;

FIG. 18A is the left portion of a circuit diagram of a control section in the third embodiment, FIG. 18 is a block diagram illustrating the relationship between FIG. 18A and FIG. 18B in the complete circuit diagram of a control section in the third embodiment, FIG. 22 is a circuit diagram of a control section in the fourth embodiment, FIG. 25B is the right portion of a circuit diagram of a control section in the fifth embodiment, FIG. 25 is a block diagram illustrating the relationship between FIG. 25A and FIG. 25B in the complete circuit diagram of a control section in the fifth embodiment, FIG. 27A is the left protion of a circuit diagram of a control section in the sixth embodiment, FIG. 27 is a block diagram illustrating the relationship between FIG. 27A and FIG. 27B in the complete circuit diagram of a control section in the sixth embodiment.

DESCRIPTION OF THE PREFERRED EMBODIMENTS

Figure 1:
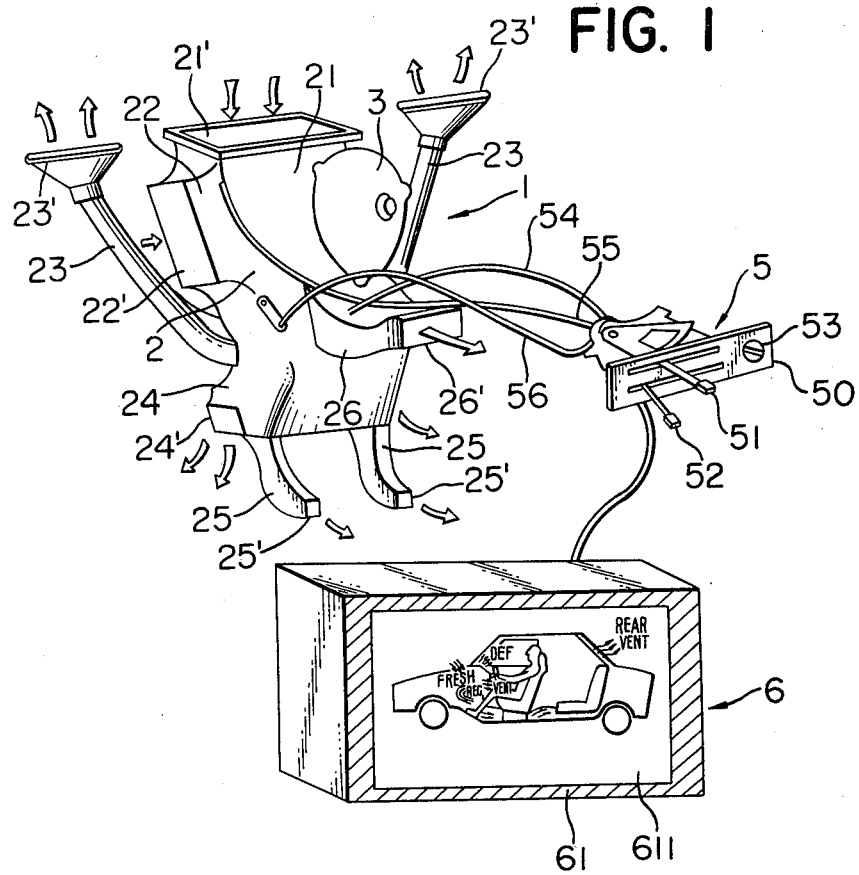
FIG. 1 is a schematic perspective view of a first embodiment of the air conditioning display system according to the present invention.

A first embodiment of the present invention will now be described in detail with reference to FIGS. 1 to 10.

Referring to FIGS. 1 to 10, a vehicle's air conditioner proper 1 includes an air duct 2, a fan unit 3 and a heater core 4. One end of the air duct 2 is branched into an external air intake duct 21 having an inlet 21' and a compartment air intake duct 22 having an inlet 22'. The other end of the air duct 2 is also branched into a defroster air discharge duct 23 having an outlet 23' and a pair of air discharge ducts 24 and 25 having outlets 24' and 25' directing air toward the foot portions of occupants on the front and rear seats respectively. A ventilation air discharge duct 26 having an outlet 26' is branched from an intermediate portion of the air duct 2 for directing air toward the upper half of the body of an occupant sitting on the front seat. A first damper 27 is disposed between the external air intake duct 21 and the compartment air intake duct 22. A second damper 28 is disposed between the defroster air discharge duct 23 and the front and rear seat foot air discharge ducts 24 and 25. A third damper 29 is disposed between the vent discharge duct 26 and the air duct 2. The fan unit 3 is disposed in the air duct 2 between the first damper 27 and the third damper 29, while the heater core 4 is disposed in the air duct 2 between the third damper 29 and the second damper 28 to be supplied with engine cooling water. A valve 40 regulates the amount of engine cooling water supplied to the heater core 4.

Figure 2:
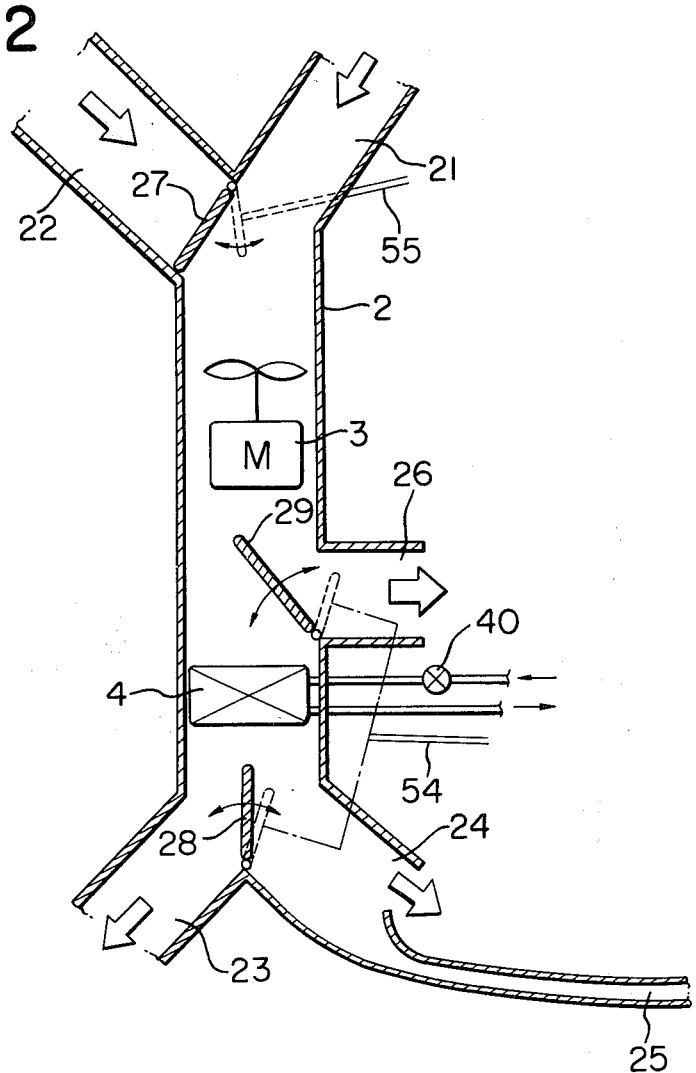
FIG. 2 illustrates part of an air conditioner proper shown in FIG. 1.

A conventional air conditioner actuator 5 is mounted adjacent to the instrument panel of the vehicle and includes an actuator panel 50, a change-over lever 51, a heater lever 52 and a fan switch 53. The changeover lever 51 is movable in the longitudinal direction of the actuator panel 50 and is operatively connected with the first to third dampers 27 to 29 by a link mechanism 511 (FIG. 6) and cables 54 and 55. When the change-over lever 51 is moved to a position A labeled "RECIRC" on the panel 50, the first damper 27 closes the external air intake duct 21 and opens the compartment air intake duct 22, and the third damper 29 closes the air duct 2 and opens the ventilation air discharge duct 26. When the change-over lever 51 is moved to another position B labeled "VENT" on the panel 50, the first damper 27 opens the external air intake duct 21 and closes the compartment air intake duct 22, while the third damper 29 remains in the position corresponding to the "RECIRC" position of the lever 51 to discharge external air from the outlet 26' of ventilation air discharge duct 26. No warm air is discharged from this outlet 26'. When the change-over lever 51 is moved to another position D labeled "HEAT" on the panel 50, the first damper 27 opens the external air intake duct 21 as in the "VENT" position of the lever 51, while the third damper 29 closes the ventilation air discharge duct 26, and the second damper 28 closes the defroster air discharge duct 23 and opens the front and rear seat foot air discharge ducts 24 and 25. When the change-over lever 51 is moved to another position C intermediate the "VENT" position and the "HEAT" position on the panel 50, the third damper 29 is placed in its neutral position as shown in FIG. 2, and air flows out from the ducts 26, 24 and 25. When the change-over lever 51 is moved to another position F labeled "DEF" on the panel 50, the third damper 29 closes the ventilation air discharge duct 26, and the second damper 28 opens the defroster air discharge duct 23 and closes the front and rear seat foot air discharge ducts 24 and 25. When the change-over lever 51 is moved to another position E intermediate the "HEAT" position and the "DEF" position on the panel 50, the second damper 28 is placed in its neutral position as shown in FIG. 2, and the ducts 23, 24 and 25 are opened partly to permit flow of air thereinto.

Figure 3:
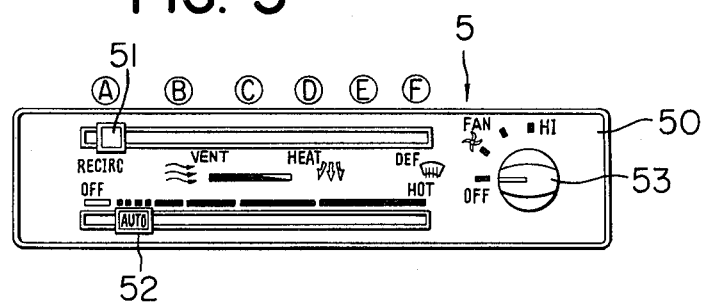
FIG. 3 is an enlarged front elevational view of an air conditioner actuator shown in FIG. 1.

The heater lever 52 is operatively connected by a cable 56 with the valve 40, and this valve 40 is full closed when the heater lever 52 is moved to the "OFF" position at the left-hand end of its stroke in FIG. 3. As the heater lever 52 is moved toward the right in FIG. 3 from the "OFF" position, the opening of the valve 40 is gradually increased until finally the valve 40 is full opened when the heater lever 52 reaches the "HOT" position at the right-hand end of its stroke in FIG. 3. The fan switch 53, which actuates the fan unit 3, is selectively placed in one of the "OFF", "Lo", "M" and "H" positions.

Figure 4:
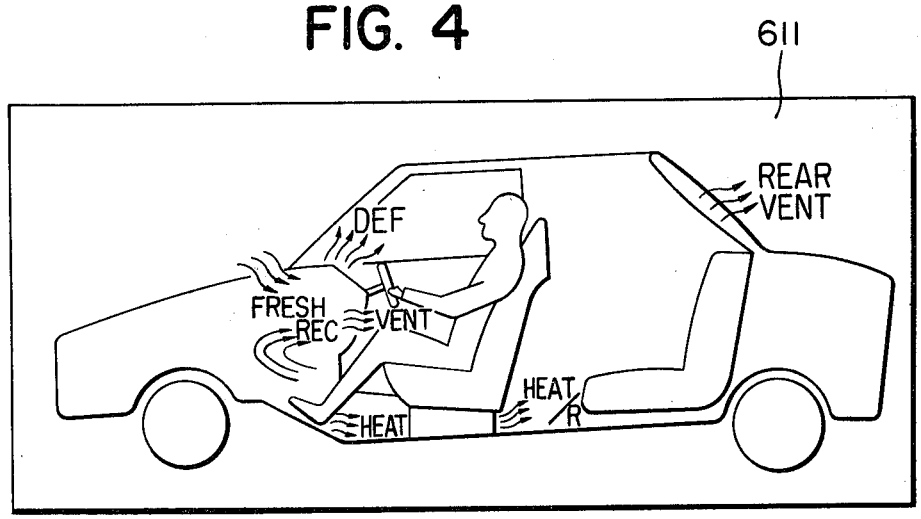
FIG. 4 is an enlarged view of a display panel shown in FIG. 1.

An air conditioning display device 6 comprises a display section 61 and a control section 62. The display section 61 is disposed adjacent to the vehicle's instrument panel and has a display panel 611 on its front face. Referring to FIG. 4, the profiles of the vehicle body, instrument panel, seats and driver are depicted on this display panel 611, together with the arrows indicating the directions of air flow into and out of the air conditioner proper 1 and the corresponding abbreviations or displays "FRESH", "REC", "DEF", "HEAT", "HEAT/R", "VENT" and "REAR VENT". The display "FRESH" displays that fresh air flows into the air conditioner proper 1 from the inlet 21' of external air intake duct 21, and the display "REC" displays that compartment air flows into the air conditioner proper 1 from the inlet 22' of compartment air intake duct 22. The display "DEF" displays that defroster air flows out from the outlet 23' of defroster air discharge duct 23, and the displays "HEAT" and "HEAT/R" display that air flows out from the outlets 24' and 25' of front seat and rear seat foot air discharge ducts 24 and 25 respectively. The display "REAR VENT" displays that compartment air flows out from a communication duct communicating between the rear part of compartment and the exterior. The display "VENT" displays that ventilation air flows out from the outlet 26' of ventilation air discharge duct 26.

Figure 5:
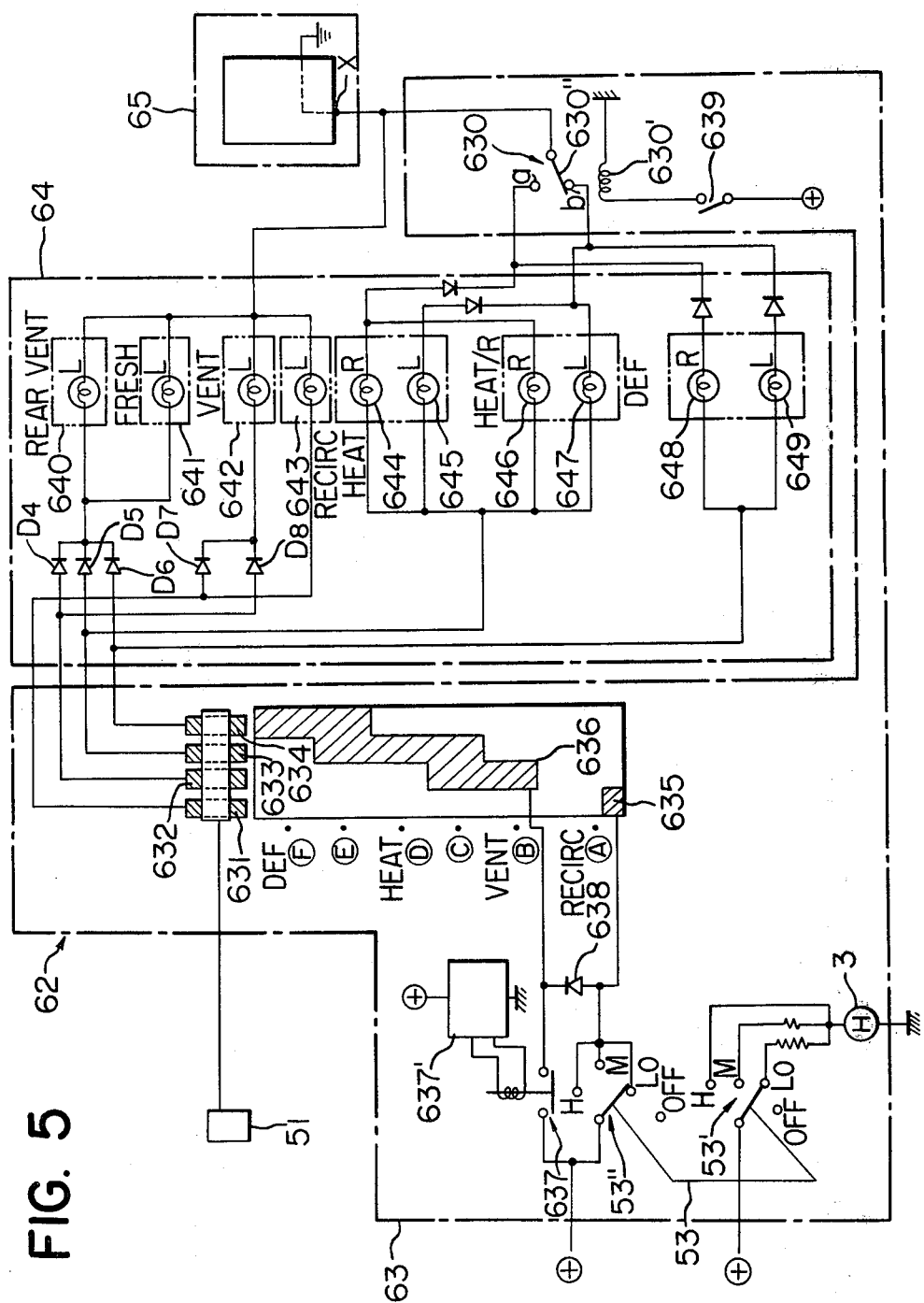
FIG. 5 is a circuit diagram of a control section in the first embodiment.
Figure 6:
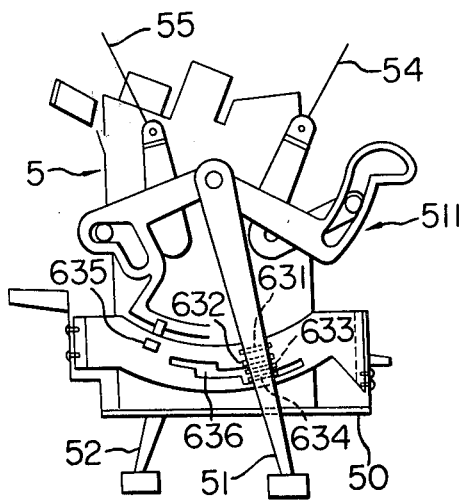
FIG. 6 is an enlarged plan view of the air conditioner actuator shown in FIG. 1.

Referring to FIG. 5, the control section 62 comprises a switch array 63 disposed in the air conditioner actuator 5 and comprises also a lamp array 64 and a flickering circuit 65 disposed on the back side of the display panel 611. The switch array 63 includes a first to a fourth conductive brush 631 to 634, a first and a second electrode plate 635, 636, a vehicle speed detector switch 637, the fan switch 53 of double switch structure, and a heater switch 639 turned on and off by the heater lever 52. The first to fourth conductive brushes 631 to 634 are arcuate in shape and are mounted in circumferentially parallel relation on the lower surface of the change-over lever 51 pivoted to a suitable portion of the air conditioner actuator 5 for making swinging movement on the panel 50 of air conditioner actuator 5 as best shown in FIG. 6. The first and second electrode plates 635 and 636 are also arcuate in shape so as to be electrically engaged by the brushes 631 to 634 as shown in FIG. 6. More precisely, the first electrode plate 635 is engaged by the first brush 631 when the change-over lever 51 is moved to the position A labeled "RECIRC"

in FIG. 3. The second electrode plate 636 has a circumferentially outwardly stepped configuration as shown in FIG. 6 and is engaged by the second brush 632 when the change-over lever 51 is moved to the position B labeled "VENT" in FIG. 3. This second electrode plate 636 is engaged by both the second and third brushes 632 and 633 when the change-over lever 51 is moved to the position C in FIG. 3, and by the third brush 633 only in the position of the lever 51 when moved to the position D labeled "HEAT". Further, this second electrode plate 636 is engaged by both the third and fourth brushes 633 and 634 when the lever 51 is moved to the position E in FIG. 3, and by the fourth brush 634 only in the position of the lever 51 when moved to the position F labeled "DEF" in FIG. 3. In FIG. 5 showing the structure of the control section 62, the first to fourth brushes 631 to 634 and the first and second electrode plates 635 and 636 are merely schematically illustrated for conveniences of explanation.

Figure 7:
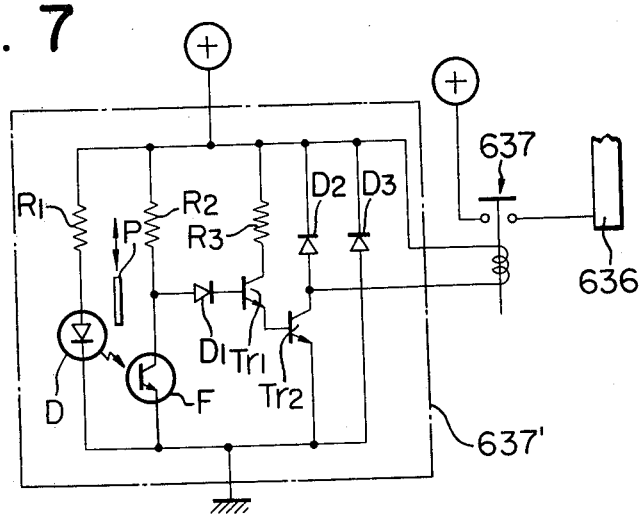
FIG. 7 is a circuit diagram of a vehicle speed detector for turning on and off a vehicle speed detector switch in the control section shown in FIG. 5.

The vehicle speed detector switch 637 is in the form of a relay and is turned on and off by a conventional vehicle speed detector 637' as shown in FIG. 7. Referring to FIG. 7, this known vehicle speed detector 637' is composed of a light-emitting diode D, a photo transistor F, diodes $D_1$ to $D_3$, transistors $Tr_1$, $Tr_2$, resistors $R_1$ to $R_3$, and a rotary disc P. When the vehicle is not running or it is running at a very low speed of, for example, less than 10 km/hr, the rotary disc P arranged for interlocking operation with the pointer of speed meter does not intercept the optical path between the light-emitting diode D and the photo transistor F. In this case, the infrared light emitted from the light-emitting diode D is received by the photo transistor F, and the internal resistance of transistor F becomes very low compared with the resistance value of resistor $R_2$, with the result that an extremely low voltage is applied to the diode $D_1$ to inhibit the transistors $Tr_1$ and $Tr_2$ from turning on. Therefore, the exciting coil of vehicle speed detector switch 637 is not energized to maintain the switch 637 in its off state. When the vehicle speed increases to a level higher than 10 km/hr, the rotary disc P arranged for interlocking operation with the pointer of speed meter intercepts now the optical path between the light-emitting diode D and the photo transistor F, and the infrared light emitted from this diode D is not received by the photo transistor F. In this case, the resistance of photo transistor F is approximately equal to the resistance value of resistor $R_2$, and a sufficiently high voltage is applied to the diode $D_1$ to turn on the transistors $Tr_1$ and $Tr_2$. Consequently, the exciting coil of vehicle speed detector switch 637 is energized to turn on this switch 637. This switch 637 is connected at one of its stationary contacts with a battery (not shown) and at the other stationary contact thereof with the second electrode plate 636. Referring to FIG. 5, the fan switch 53 of double switch structure, which is selectively placed in one of the "OFF", "Lo", "M" and "H" positions as described hereinbefore, consists of a first switch 53' and a second switch 53". The first switch 53' is connected at its "Lo" terminal with the fan unit 3 through a first resistor, at its "M" terminal with the fan unit 3 through a second resistor having a smaller resistance value than the first resistor, and at its "H" terminal directly with the fan unit 3 without any resistor interposed therebetween. The "Lo", "M" and "H" terminals of the second switch 53" are interconnected to be connected directly with the first electrode plate 635 and with the second electrode plate 636 through a diode 638.

Referring to FIG. 5, the lamp array 64 includes a first to a tenth lamp 640 to 649 disposed on the back side of the display panel 611. The first lamp 640 emitting blue light is disposed on the back side of the display "REAR VENT" and its air flow pattern display "≋" on the display panel 611 to illuminate these displays with blue light when energized. This lamp 640 is connected at one terminal thereof with a first to a third diode $D_4$ to $D_6$ and at the other terminal thereof with a terminal X of the flickering circuit 65 described later. The second lamp 641 which emits blue light also is disposed on the back side of the display "FRESH" and its air flow pattern display on the display panel 611 to illuminate these displays with blue light when energized. This lamp 641 is connected in parallel with the first lamp 640. The third lamp 642 emitting blue light also is disposed on the back side of the display "VENT" and its air flow pattern display to illuminate these displays with blue light when energized. This lamp 642 is conneced at one terminal thereof with a fourth and a fifth diode $D_7$ and $D_8$ and at the other terminal thereof with the terminal X of flickering circuit 65. The first, second and third diodes $D_4$, $D_5$ and $D_6$ are connected with the second, third and fourth brushes 632, 633 and 634 respectively. The fourth and fifth diodes $D_7$ and $D_8$ are connected with the first and second brushes 631 and 632 respectively. The fourth lamp 643 emitting blue light also is disposed on the back side of the display "REC" and its air flow pattern display on the display panel 611 to illuminate these displays with blue light when energized. This lamp 643 is connected at one terminal thereof with the first brush 631 and at the other terminal thereof with the terminal X of flickering circuit 65. The fifth lamp 644 emitting red light is disposed on the back side of the display "HEAT" and its air flow pattern display on the display panel 611 to illuminate these displays with red light when energized. This lamp 644 is connected at one terminal thereof with the third brush 633 and at the other terminal thereof with a relay 630 described later. The sixth lamp 645 emitting blue light is disposed in close proximity to the fifth lamp 644 to illuminate the display "HEAT" and its air flow pattern display with blue light when energized. This lamp 645 is connected at one terminal thereof with the third brush 633 and at the other terminal thereof with the relay 630. The seventh lamp 646 emitting red light is disposed on the back side of the display "HEAT/R" and its air flow pattern display on the display panel 611 to illuminate these displays with red light when energized. This lamp 646 is connected in parallel with the fifth lamp 644. The eighth lamp 647 emitting blue light is disposed in close proximity to the seventh lamp 646 to illuminate the display "HEAT/R" and its air flow pattern display with blue light when energized. This lamp 647 is connected in parallel with the sixth lamp 645. The ninth lamp 648 emitting red light is disposed on the back side of the display "DEF" and its air flow pattern display on the display panel 611 to illuminate these displays with red light when energized. This lamp 648 is connected at one terminal thereof with the fourth brush 634 and at the other terminal thereof with the relay 630. The tenth lamp 649 emitting blue light is disposed adjacent to the ninth lamp 648 to illuminate the display "DEF" and its air flow pattern display with blue light when energized. This lamp 649 is connected at one terminal thereof with the fourth brush 634 and at the other terminal thereof with the relay 630. In FIG. 5, the symbols L and R designate the blue-emitting and red-emitting lamps respectively.

The heater switch 639 in the switch array 63 is in the form of a microswitch and is disposed in the air conditioner actuator 5 to be connected at one of its stationary contacts with the exciting coil 630' of relay 630. In this relay 630, its movable contact or arm 630" is brought into contact with a stationary contact b when the heater lever 52 is placed in the "OFF" position in FIG. 3, and this movable arm 630" is brought into contact with another stationary contact a when the heater lever 52 is moved to any other position than the "OFF" position, that is, when the valve 40 is opened to permit supply of engine cooling water to the heater core 4. The contact a of relay 630 is connected with the fifth, seventh and ninth lamps 644, 646 and 648, while the contact b is connected with the sixth, eighth and tenth lamps 645, 647 and 649. The movable arm 630" of relay 630 is connected with the terminal X of flickering circuit 65.

Figure 8:
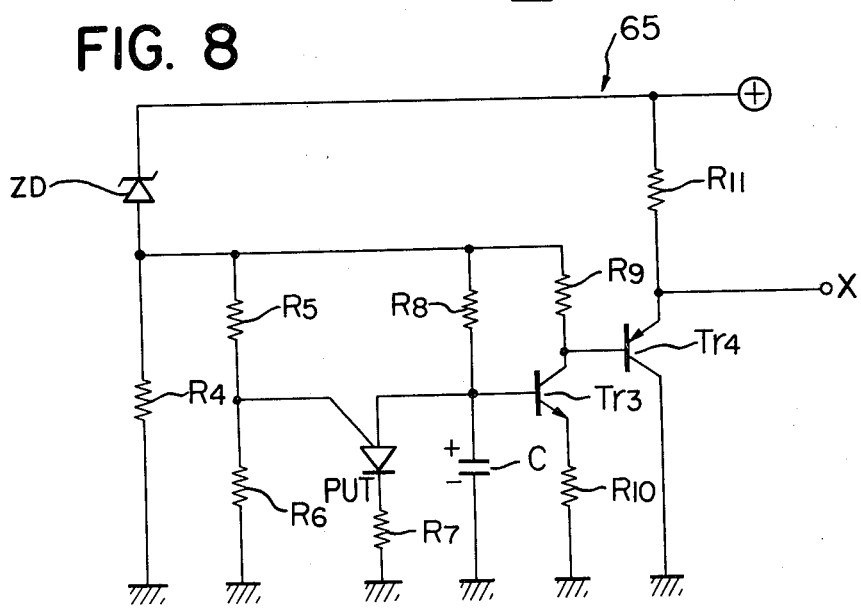
FIG. 8 is a circuit diagram of a flickering circuit in the control section shown in FIG. 5.
Figure 9:
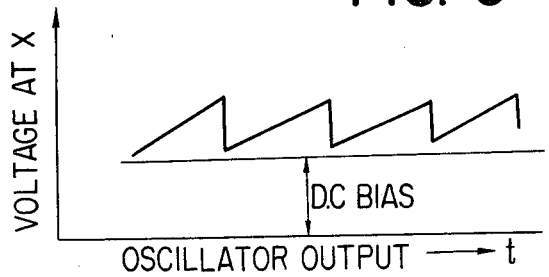
FIG. 9 is a graph showing the variation of voltage at a terminal X of the flickering circuit relative to time.
Figure 10:
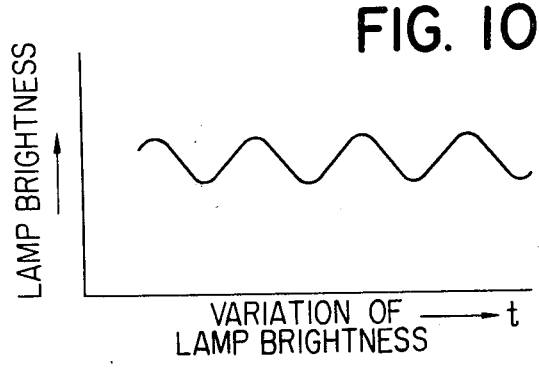
FIG. 10 is a graph showing the variation of brightness of lamps, connected with the flickering circuit.

The flickering circuit 65 is composed of a programmable unijunction transistor PUT, resistors $R_4$ to $R_{11}$, transistors $Tr_3$, $Tr_4$, a capacitor C and a Zener diode ZD, as shown in FIG. 8. The oscillation circuit consisting of the programmable unijunction transistor PUT, resistors $R_5$ to $R_8$ and capacitor C generates an output voltage having a waveform as shown in FIG. 9. This output voltage is inversed by the transistor $Tr_3$ and amplified by the amplifier consisting of the transistor $Tr_4$ and resistors $R_9$, $R_{10}$, $R_{11}$, and the electric potential is varied. Thus, the brightness of light emitted from the first to tenth lamps 640 to 649 connected with this terminal X varies in a manner as shown in FIG. 10. The resistor $R_4$ and Zener diode ZD act to apply a DC bias to the output voltage of the oscillation circuit so that the brightness variation or flickering occurs in the light emitted from these lamps in the manner shown in FIG. 10 without these lamps making flashing operation.

In operation, the change-over level 51 of the air conditioner actuator 5 is moved to the position A labeled "RECIRC" to bring the first brush 631 into electrical contact with the first electrode plate 635. In the "OFF" position of the fan switch 53, no current is supplied from the battery to the first electrode plate 635, and none of the first to tenth lamps 640 to 649 are energized.

Then, when the fan switch 53 is placed in any one of the "Lo", "M" and "H" positions in the above state, air sucked into the compartment air intake duct 22 from its inlet 22' is discharged from the outlet 26' of vent discharge duct 26. Due to the turn-on of the fan switch 53, current from the battery is supplied through the first electrode plate 635 and first brush 631 to the third and fourth lamps 642 and 643 to energize the same. Consequently, the displays "REC" and "VENT" and their air flow pattern displays on the display panel 611 are illuminated with blue light. In this case, the brightness of light emitted from the third and fourth lamps 642 and 643 are repeatedly varied by the action of the flickering circuit 65 thereby illuminating these displays with flickering blue light.

When the change-over lever 51 is moved to the position B labeled "VENT", the second brush 632 only is brought into electrical contact with the second electrode plate 636. Suppose that the fan switch 53 is not turned on, and the vehicle is not running or it is running at a speed lower than 10 km/hr in this case. Then, no current is supplied to the second electrode plate 636 since the vehicle speed detector switch 637 is in its off state, and none of the first to tenth lamps 640 to 649 are energized. Suppose, then, that the fan switch 53 is not turned on, and the vehicle is running at a speed higher than 10 km/hr, in this case. Then, the vehicle speed detector switch 637 is turned on, and current from the battery is supplied through the second electrode plate 636 and second brush 632 to the first, second and third lamps 640, 641 and 642 to energize the same so that the displays "REAR VENT", "FRESH" and "VENT" and their air flow pattern displays are illuminated with blue light emitted from these lamps 640, 641 and 642. In this case too, the light emitted from these lamps 640, 641 and 642 flickers by the action of the flickering circuit 65. Suppose, further, that the fan switch 53 is placed in one of the "Lo", "M" and "H" positions when the vehicle is not running or it is running at a speed lower than 10 km/hr. Then, the first to third lamps 640 to 642 are energized to illuminate the displays "REAR VENT", "FRESH" and "VENT" and their air flow pattern displays with blue light as in the above case.

When the change-over lever 51 is moved to the position C intermediate the "VENT" and "HEAT" positions, the second and third brushes 632 and 633 are brought into electrical contact with the second electrode plate 636. Suppose that the vehicle is not running or it is running at a speed lower than 10 km/hr, and the fan switch 53 is not turned on in such a case, then none of the first to tenth lamps 640 to 649 are energized. Suppose, then, that the fan switch 53 is not turned on, and the vehicle is running at a speed higher than 10 km/hr in this case. Then, the vehicle speed detector switch 637 is turned on, and current from the battery is supplied through the second electrode plate 636 to the second and third brushes 632 and 633. When the heater lever 52 is located in its "OFF" position in such a case, the heater switch 639 is not turned on, and the movable arm 630" of relay 630 is brought into contact with the stationary contact b. Consequently, the current supplied from the battery to the second and third brushes 632 and 633 is now supplied to the first, second, third, sixth and eighth lamps 640, 641, 642, 645 and 647 to illuminate the displays "REAR VENT", "FRESH", "VENT", "HEAT" and "HEAT/R" and their air flow pattern displays with blue light emitted from these lamps 640, 641, 642, 645 and 647. In this case, the light emitted from these lamps flickers by the action of the flickering circuit 65. In the position of the heater lever 52 except the "OFF" position, the heater switch 639 is turned on to bring the movable arm 630" of relay 630 into contact with the stationary contact a. Consequently, current supplied from the battery to the second and third brushes 632 and 633 is now supplied to the first, second, third, fifth and seventh lamps 640, 641, 642, 644 and 646 to illuminate the displays "REAR VENT", "FRESH" and "VENT" and their air flow pattern displays with blue light emitted from the lamps 640, 641 and 642 and to illuminate the displays "HEAT" and "HEAT/R" and their air flow pattern displays with red light emitted from the lamps 644 and 646. In this case too, the light emitted from these lamps flickers by the action of the flickering circuit 65. The same applies to the case in which the fan switch 53 is placed in one of the "Lo", "M" and "H" positions when the vehicle is running at a speed lower than 10 km/hr.

When the change-over lever 51 is moved to the position D labeled "HEAT", the third brush 633 only is brought into electrical contact with the second electrode plate 636. Suppose that the fan switch 53 is placed in one of the "Lo", "M" and "H" positions, or the vehicle is running at a speed higher than 10 km/hr, and the heater lever 52 is kept in its "OFF" position in this case. Then, current from the battery is supplied to the first, second, sixth and eighth lamps 640, 641, 645 and 647 to illuminate the displays "REAR VENT", "FRESH", "HEAT" and "HEAT/R" and their air flow pattern displays with flickering blue light emitted from these of the heater lever 52 except the "OFF" position, the ninth lamp 648 is energized in lieu of the tenth lamp 649 to illuminate the display "DEF" and its air flow pattern display with flickering red light emitted from the lamp 648.

Table 1 shows the on-off display modes of the lamps 640 to 649 illuminating the displays.

Table 1

| Fan Switch Position | Display Lamp | Change-over Lever Position Heater Lever Position | Recirc A Off | Except Off | Vent B Off | Except Off | Between Vent And Heat C Off | Except Off | Heat D Off | Except Off | Between Heat And Def E Off | Except Off | Def F Off | Except Off |
|---|---|---|---|---|---|---|---|---|---|---|---|---|---|---|
| Off (During Running) * | Def | | — | — | — | — | — | — | — | — | L | R | L | R |
| | Vent | | — | — | L | L | L | L | — | — | — | — | — | — |
| | Heat | | — | — | — | — | L | R | L | R | L | R | — | — |
| | Heat/R | | — | — | — | — | L | R | L | R | L | R | — | — |
| Except Off | Def | | — | — | — | — | — | — | — | — | L | R | L | R |
| | Vent | | L | L | L | L | L | L | — | — | — | — | — | — |
| | Heat | | — | — | — | — | L | R | L | R | L | R | — | — |
| | Heat/R | | — | — | — | — | L | R | L | R | L | R | — | — |

REMARKS:
1. Symbol "—" Indicates that corresponding lamp is not energized. Symbols "L" and "R" designate blue-emitting and red-emitting lamps respectively.
2. Symbole "*" indicates that none of lamps are energized when fan is off and vehicle is not running.

lamps. In the position of the heater lever 52 except the "OFF" position, the fifth and seventh lamps 644 and 646 are energized in lieu of the sixth and eighth lamps 645 and 647 to illuminate the displays "HEAT" and "HEAT/R" and their air flow pattern displays with flickering red light emitted from these lamps.

When the change-over lever 51 is moved to the position E intermediate the "HEAT" and "DEF" positions, the third and fourth brushes 633 and 634 are brought into electrical contact with the second electrode plate 636. Suppose that the fan switch 53 is placed in one of the "Lo", "M" and "H" positions, or the vehicle is running at a speed higher than 10 km/hr, and the heater lever 52 is kept in its "OFF" position in this case. Since, the movable arm 630" of relay 630 is now in contact with the stationary contact b, current supplied from the battery to the third and fourth brushes 633 and 634 is supplied to the first, second, sixth, eighth and tenth lamps 640, 641, 645, 647 and 649 to illuminate the displays "REAR VENT", "FRESH", "HEAT", "HEAT/R" and "DEF" and their air flow pattern displays with flickering blue light emitted from these lamps. In the position of the heater lever 52 except the "OFF" position, the movable arm 630" of relay 630 is in contact with the stationary contact a. Consequently, the fifth, seventh and ninth lamps 644, 646 and 648 are energized in lieu of the sixth, eighth and tenth lamps 645, 647 and 649 to illuminate the displays "HEAT", "HEAT/R" and "DEF" and their air flow pattern displays with flickering red light emitted from these lamps.

When the change-over lever 51 is moved to the position F labeled "DEF", the fourth brush 634 only is brought into electrical contact with the second electrode plate 636. Suppose that the fan switch 53 is placed in one of the "Lo", "M" and "H" positions, or the vehicle is running at a speed higher than 10 km/hr, and the heater lever 52, hence, the heater switch 639 is kept in its "OFF" position in this case. Then, the first, second and tenth lamps 640, 641 and 649 are energized to illuminate the displays "REAR VENT", "FRESH" and "DEF" and their air flow pattern displays with flickering blue light emitted from these lamps. In the position It will be understood from the above description that the specific displays displaying the suction and discharge of air into and out of the specific ducts in the vehicle's air conditioner proper 1 become luminant on the display panel 611, and the displays corresponding to the discharge modes are illuminated with red light and blue light depending on the air temperature at the duct outlets, that is, when the heater is in use and not in use respectively, so that the driver and other occupants of the vehicle compartment can readily visually confirm the operating state of the air conditioner proper 1. Further, an occupant who has not sufficient knowledge as to the manipulation of the air conditioner will be able to make necessary manipulation for discharging warm or cold air from the duct outlets by merely actuating the change-over lever 51 and heater lever 52 while observing the displays on the display panel 611. The air conditioning display device is combined with the vehicle speed detector switch 637 and fan switch 53 so that the lamps displaying the flow-out of air from the duct outlets can be energized only when such air actually flows out.

In the first embodiment described hereinbefore, the red-emitting and blue-emitting lamps have been used for the air conditioning display. However, any other suitable combination of colors capable of distinguishing between warm air and cold air may be employed. For example, orange-emitting and green-emitting lamps may be used in lieu of the red-emitting and blue-emitting lamps. Further, in lieu of these lamps, self-emitting elements, light-emitting diodes, liquid crystals or any other suitable elements may be used.

Figure 11:
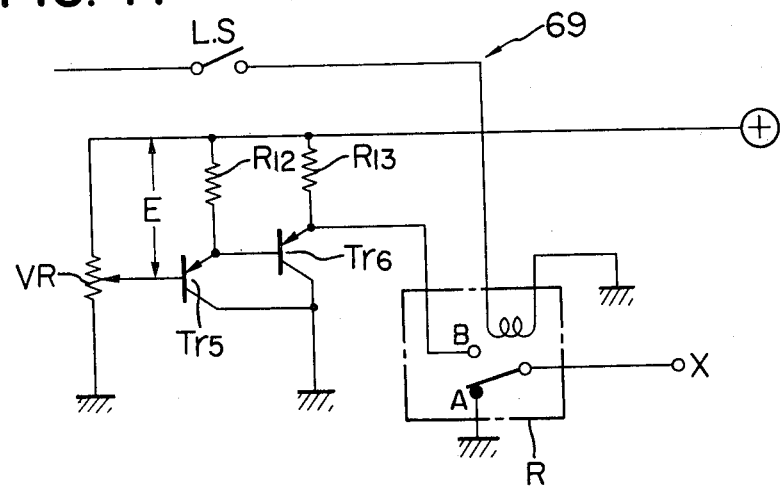
FIG. 11 is a circuit diagram of a light intensity attenuating circuit.

A light intensity attenuating circuit 69 as shown in FIG. 11 may be employed in place of the flickering circuit 65 incorporated in the first embodiment of the present invention. Referring to FIG. 11, this light intensity attenuating circuit 69 is composed of a variable resistor VR, resistors $R_{12}$, $R_{13}$, transistors $Tr_5$, $Tr_6$, a relay R and a lighting switch L.S. When the lighting switch L.S is turned off, the movable arm of relay R is brought into contact with a stationary contact A to short the terminal X to ground, with the result that the lamps 640 to 649 emit light of high intensity. On the other hand, when the lighting swith L.S is turned on, the movable arm of relay R is brought into contact with another stationary contact B to connect the terminal X to ground through the transistors Tr$_5$, Tr$_6$ and variable resistor VR, with the result that the intensity of light emitted from the lamps 640 to 649 is attenuated to a level lower than when the movable arm of relay R is in contact with the contact A.

In the first embodiment, a blue-emitting lamp has been used as the fourth lamp 643 which illuminates the display "RECIRC". However, this fourth lamp 643 may be a red-emitting lamp. Further, although the vehicle speed detector switch 637 has been arranged to be turned on at a vehicle speed higher than 10 km/hr, this switch 637 may be such that it is kept in its off position when the vehicle is not running, but it is immediately turned on when the vehicle starts to run. Further, although the vehicle speed detector switch 637 used in the first embodiment has been set to be turned on at the vehicle speed higher than 10 km/hr, the speed setting is in no way limited to the above value and may be suitably selected as desired.

In the first embodiment, the heater switch 639 has been arranged to be turned on when the heater lever 52 is moved from its "OFF" position. However, this heater switch 639 may be arranged to be turned on at the position at which warm air is actually discharged from the ducts as the heater lever 52 is moved from its "OFF" position toward its "HOT" position.

Figure 12:
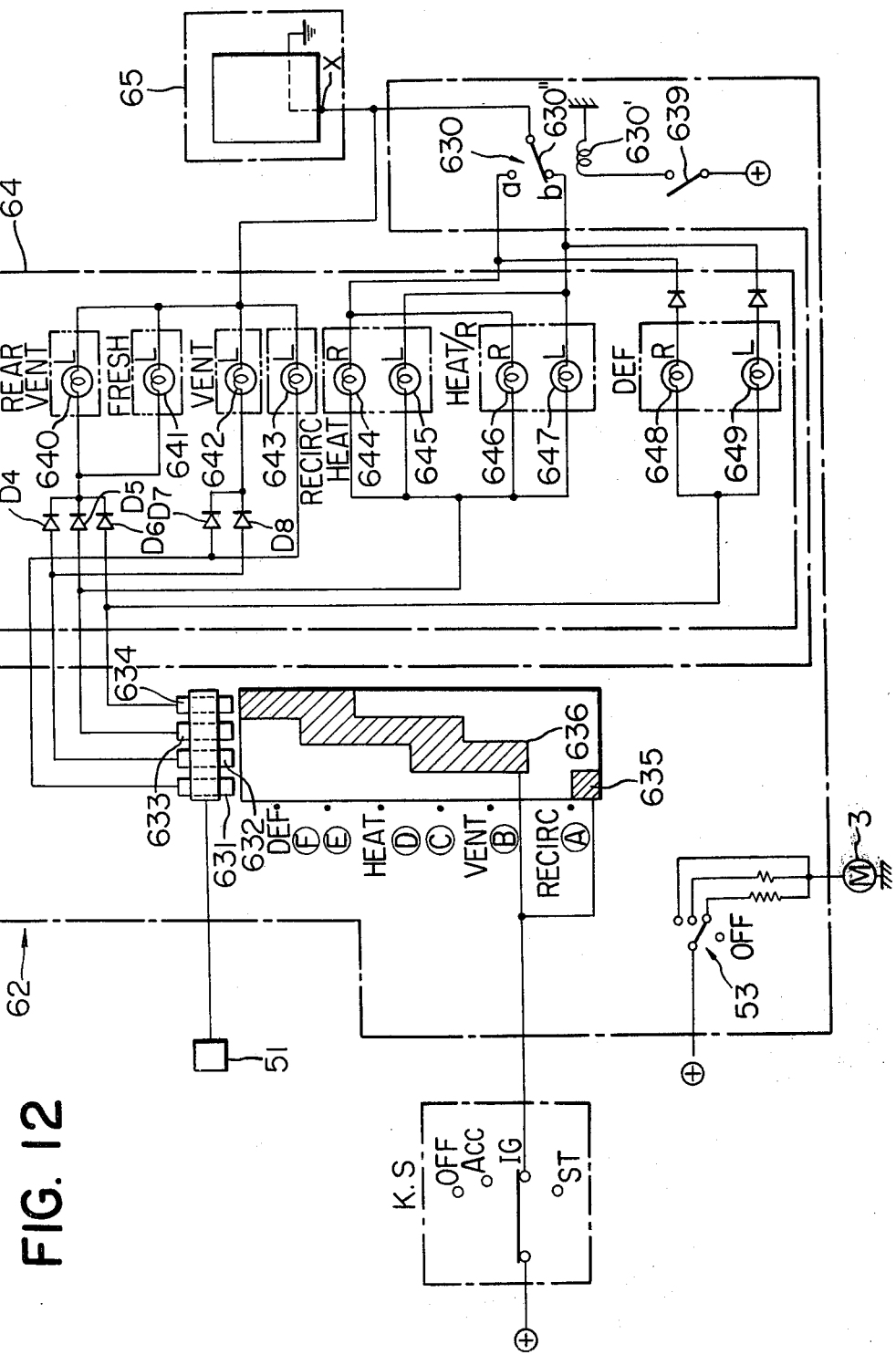
FIG. 12 is a circuit diagram of a control section in a second embodiment of the present invention.
Figure 13:
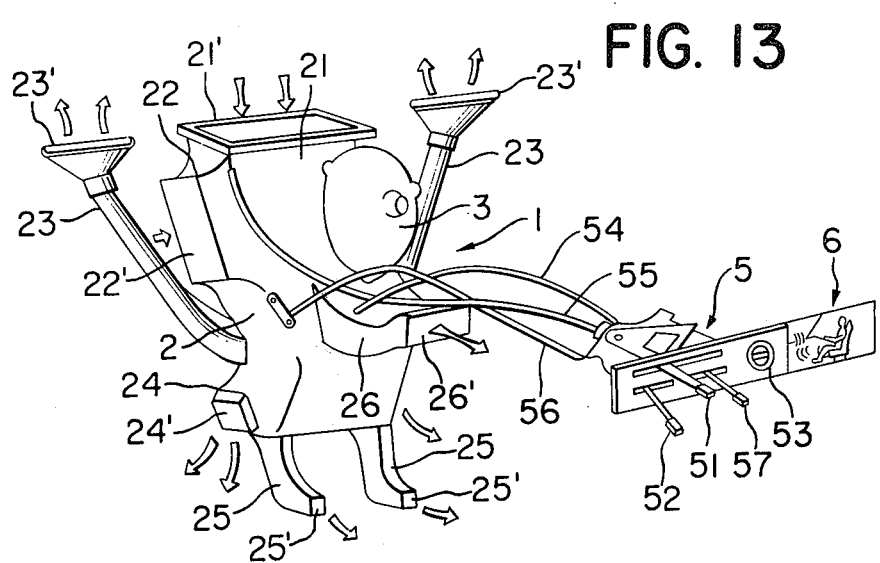
FIG. 13 is a schematic perspective view of a third embodiment of the present invention.
Figure 15:
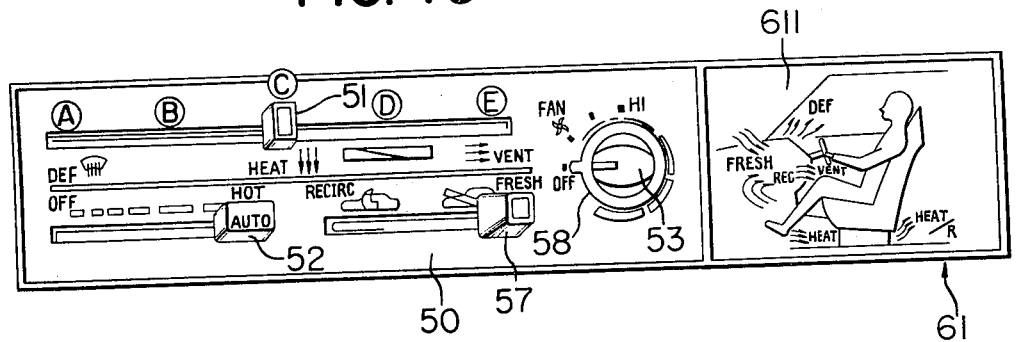
FIG. 15 is an enlarged front elevational view of an air conditioner actuator 5 and a display section shown in FIG. 13.

FIG. 12 shows part of a second embodiment, or a partial modification of the first embodiment, of the present invention, in which the vehicle speed detector switch 637 and the second switch 53" of the fan switch 53 in the control section 62 are eliminated, and in lieu thereof, the first and second electrode plates 635 and 636 are connected directly with the terminal IG of vehicle's ignition key switch K.S. Table 2 shows the on-off display modes of the lamps 640 to 649 illuminating the displays in response to the manipulation of the change-over lever 51, ignition key switch K.S and heater lever 52.

According to this second embodiment, therefore, the display panel 611 displays as to which duct outlets are now ready to discharge air and also as to whether external air can now be admitted into the external air intake duct, although actual flow of air into and out of these ducts does not still take place at that time. Thus, the air conditioner can be very easily previously placed in the desired operating conditions before the vehicle starts to run.

FIGS. 13 to 18 show a third embodiment of the present invention, and like reference numerals are used therein to designate like parts appearing in FIGS. 1 to 10.

Referring to FIGS. 13 to 18, an air conditioner proper 1 includes an air duct 2 similar to that in the first embodiment. This air duct 2 includes an external air intake duct 21 having an inlet 21', a compartment air intake duct 22 having an inlet 22', a defroster air discharge duct 23 having an outlet 23', a front seat foot air discharge duct 24 having an outlet 24', a rear seat foot air discharge duct 25 having an outlet 25', a ventilation air discharge duct 26 having an outlet 26', a first damper 27, a second damper 28 and a third damper 29. A fan unit 3 is disposed in the air duct 2 between the first and third dampers 27 and 29, and a heater core 4 is disposed in the air duct 2 between the second and third dampers 28 and 29. A valve 40 regulates the amount of engine cooling water supplied to the heater core 4. An evaporator 7 of a cooler is disposed in the compartment air intake duct 22.

Figure 14:
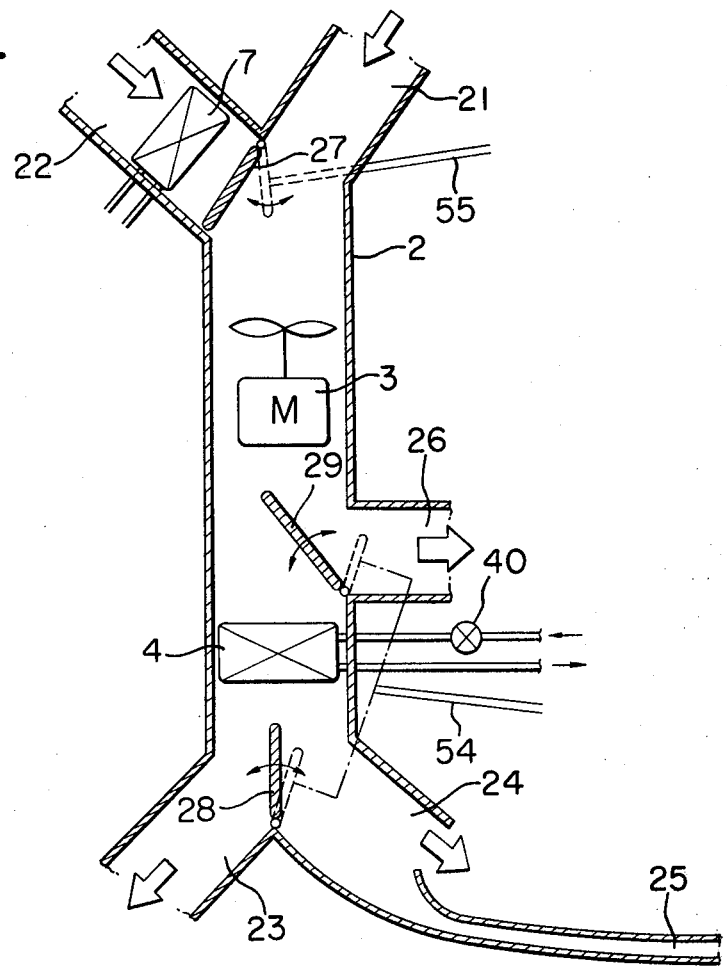
FIG. 14 illustrates part of an air conditioner proper shown in FIG. 13.

An air conditioner actuator 5 is mounted adjacent to the instrument panel of the vehicle and includes an actuator panel 50, a change-over lever 51, a heater lever 52, a fan switch 53, an internal-external air lever 57 and a cooler switch 58. The change-over 51 is operatively connected with the second and third dampers 28 and 29 by a cable 54. When the change-over lever 51 is moved to a position A labeled "DEF" on the panel 50, the second damper 28 closes the foot air discharge ducts 24 and 25 and opens the defroster air discharge duct 23, while the third damper 29 closes the ventilation air discharge duct 26. When the change-over lever 51 is moved to a position B intermediate the position A labeled "DEF" and a position C labeled "HEAT", the third damper 29 remains in the position corresponding to the "DEF" position of the change-over lever 51, and the second damper 28 takes its neutral position as shown in FIG. 14 to partly open the defroster air discharge duct 23 and foot air discharge ducts 24, 25. When the change-over lever 51 is moved to the position C labeled "HEAT", the second damper 28 closes the defroster air discharge duct 23 and opens the foot air discharge ducts 24, 25 while the third damper 29 remains still in the position closing the ventilation air discharge duct 26. When the change-over lever 51 is moved to a position D intermediate the "HEAT" position and a position E Table 2

| K·S | Display Lamp | Heater Lever Position | Change-over Lever Position Recirc A | | Vent B | | Between Bent And Heat C | | Heat D | | Between Heat And Def E | | Def F | |
|---|---|---|---|---|---|---|---|---|---|---|---|---|---|---|
| | | | Off | Except Off | Off | Except Off | Off | Except Off | Off | Except Off | Off | Except Off | Off | Except Off |
| IG | Rear Vent | | — | — | L | L | L | L | L | L | L | L | L | L |
| | Fresh | | — | — | L | L | L | L | L | L | L | L | L | L |
| | Vent | | L | L | L | L | L | L | — | — | — | — | — | — |
| | Recirc | | L | L | — | — | — | — | — | — | — | — | — | — |
| | Heat | | — | — | — | — | L | R | L | R | L | R | — | — |
| | Heat/R | | — | — | — | — | L | R | L | R | L | R | — | — |
| | Def | | — | — | — | — | — | — | — | — | L | R | L | R |
| Off ACC | | | None of Lamps are Energized. | | | | | | | | | | | |

REMARKS:
1. Symbol "—" indicates that corresponding lamp is not energized.
2. Symbol "L" designates blue-emitting lamp.
3. Symbol "R" designates red-emitting lamp.

labeled "VENT", the third damper 29 takes its neutral position as shown in FIG. 14 to permit flow of air through the ventilation air discharge duct 26 and foot air discharge ducts 24, 25, while the second damper 28 remains in the same position as it takes in the "HEAT" position of the change-over lever 51. When the change-over lever 51 is moved to the position E labeled "VENT", the third damper 29 closes the air duct 2 and opens the ventilation air discharge duct 26. The heater lever 52 is operatively connected with the valve 40 by a cable 56, and this valve 40 is fully closed when the heater lever 52 is kept in its "OFF" position at the left-hand end of its stroke in FIG. 15. As the heater lever 52 is moved toward the right in FIG. 15 from the "OFF" position, the opening of the valve 40 is gradually increased until finally the valve 40 is fully opened when the heater lever 52 reaches the "HOT" position at the right-hand end of its stroke in FIG. 15. The fan switch 53 is selectively placed in one of the "OFF", "L", "M" and "H" positions. The internal-external air lever 57 is operatively connected with the first damper 27 by a cable 55, so that, when this lever 57 is moved to a position labeled "RECIRC", the first damper 27 closes the external air intake duct 21 and opens the compartment air intake duct 22, while when the lever 57 is moved to a position labeled "FRESH", the first damper 27 opens the external air intake duct 21 and closes the compartment air intake duct 22. In the "OFF" position of the cooler switch 58, the refrigerant is not supplied to the cooler evaporator 7. As this switch 58 is turned clockwise in FIG. 15 from its "OFF" position, the refrigerant is supplied to the evaporator 7, and the amount of the supplied refrigerant is controlled by the angular position of the switch 58.

An air conditioning display device 6 comprises a display section 61 and a control section 62. The display section 61 is disposed adjacent to the air conditioner actuator 5 and includes a display panel 611, a smoked panel 612, a shielding plate 613, partition plates 614 and a casing 615. The display panel 611 is in the form of a transparent plate of glass or acrylic resin fixed at its peripheral edges to the casing 615, and the profiles 611' of the vehicle's front glass, bonnet, instrument panel and driver are depicted on the back face of the transparent plate with a paint of color such as white which is easily visible to the eye. An illuminating lamp 650 is disposed along the lower edge of the display panel 611. The smoked panel 612, which is a plate of glass or acrylic resin, is disposed on the back side of the display panel 611 in slightly spaced apart relation therefrom, and the shielding plate 613 is bonded to the back face of the smoked panel 612. Display patterns consisting of displays "FRESH", "REC", "DEF", "HEAT", "HEAT/R" and "VENT" and the corresponding arrows indicating the directions of air flow into and out of the air conditioner proper 1 are provided by cutting out portions of the shielding plate 613.

Figure 16:
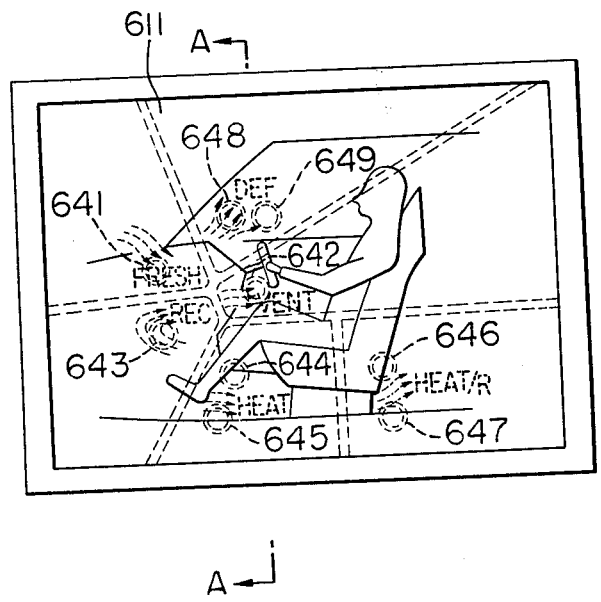
FIG. 16 is an enlarged detail view of the display section shown in FIG. 15.
Figure 17:
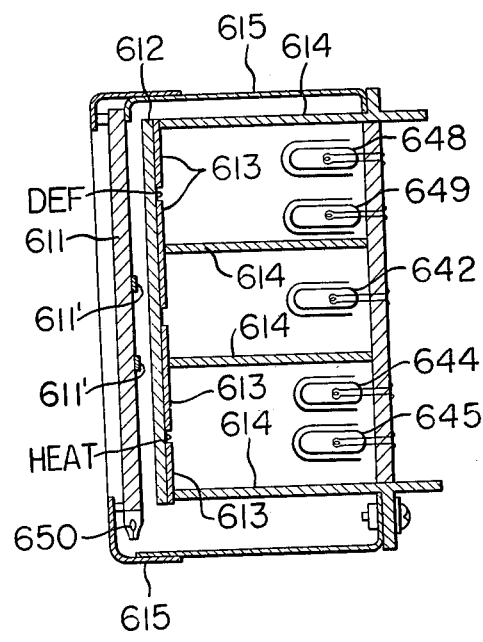
FIG. 17 is a sectional view taken along the line A—A in FIG. 16.

The partition plates 614 extend on the back side, or right-hand side in FIG. 17, of the shielding plate 613 so as to define independent spaces for the illumination of the individual display patterns as shown in FIG. 17. Referring to FIG. 16, a blue-emitting second lamp 641 is disposed in the space behind the display "FRESH" and its air flow pattern display on the display panel 611, and a blue-emitting fourth lamp 643 is disposed in the space behind the display "REC" and its air flow pattern display. A red-emitting ninth lamp 648 and a blue-emitting tenth lamp 649 are disposed in the space behind the display "DEF" and its air flow pattern display, and a red-emitting fifth lamp 644 and a blue-emitting sixth lamp 645 are disposed in the space behind the display "HEAT" and its air flow pattern display. A red-emitting seventh lamp 646 and a blue-emitting eighth lamp 647 are disposed in the space behind the display "HEAT/R" and its air flow pattern display, and a blue-emitting third lamp 642 is disposed in the space behind the display "VENT" and its air flow pattern display. The red-emitting lamps are provided by covering incandescent lamps with a red cap, and the blue-emitting lamps are provided by covering incandescent lamps with a blue cap.

The control section 62 comprises a switch array 63 disposed in the air conditioner actuator 5, a lamp array 64 disposed on the back side of the display panel 611, and a flickering circuit 65. The switch array 63 includes a second, a third and a fourth brush 632, 633, 634, a second electrode plate 636, the fan switch 53, a heater switch 630, an internal-external air switch 570 and the cooler switch 58. The structure and operation of the second to fourth brushes 632 to 634 and second electrode plate 636 are entirely similar to those described with reference to the first embodiment. The heater switch 630 is connected with a terminal X of flickering circuit 65, and its movable arm is in contact with a stationary contact b when the heater lever 52 is places in its "OFF" position. In any other position of the heater lever 52, its movable arm is brought into contact with another stationary contact a. The internal-external air switch 570 is switched over from one position to the other with the movement of the internal-external air lever 57. That is, its movable arm is brought into contact with a stationary contact a when the lever 57 is moved to the "RECIRC" position, while its movable arm is brought into contact with another stationary contact b when the lever 57 is moved to the "FRESH" position. The fan switch 53 controls the amount of air discharged from the fan unit 3 depending on its "L", "M" or "H" position, and this switch 53 is so connected that current from the battery can be supplied to the second electrode plate 636 and to the internal-external air switch 570 in any one of its "L", "M" and "H" positions.

The lamp array 64 includes the aforementioned second to tenth lamps 641 to 649, the aforementioned illuminating lamp 650 and a cooler raly 580. The second lamp 641 is connected at one terminal thereof with the contact b of internal-external air switch 570 and at the other terminal thereof with the terminal X of flickering circuit 65. The third lamp 642 is connected at one terminal thereof with the fourth brush 634 and at the other terminal thereof with the terminal X of flickering circuit 65. The fourth lamp 643 is connected at one terminal thereof with the contact a of internal-external air switch 570 and at the other terminal thereof with the terminal X of flickering circuit 65. The fifth lamp 644 is connected at one terminal thereof with the third brush 633 and at the other terminal thereof with one stationary contact of cooler relay 580 through a diode $D_9$. The sixth lamp 645 is connected at one terminal thereof with the third brush 633 and at the other terminal thereof with the contact b of heater switch 630 through a diode $D_{10}$. The seventh lamp 646 and eighth lamp 647 are connected in parallel with the fifth lamp 644 and sixth lamp 645 respectively. The ninth lamp 648 is connected at one terminal thereof with the second brush 632 and at the other terminal thereof with the contact of cooler relay 580 through a diode $D_{11}$. The tenth lamp 649 is connected at one terminal thereof with the second brush 632 and at the other terminal thereof with the contact b of heater switch 630 through a diode $D_{12}$. The other stationary contact of cooler relay 580 is connected with the contact a of heater switch 630, and the coil 581 of cooler relay 580 is connected at one end thereof with the cooler switch 58 and is grounded at the other end thereof. The illuminating lamp 650 is connected at one terminal thereof with the lighting switch L.S used for the on-off of the vehicle's head lamps, clearance lamps, etc. and is grounded at the other terminal thereof. The cooler switch 58 is so constructed that it is not turned on unless the internal-external air lever 57 is placed in the "RECIRC" position. The structure of the flickering circuit 65 is entirely the same as that described with reference to the first embodiment.

In the description of operation hereinafter, explanation of the air flow pattern displays is omitted, but they are illuminated on the display panel together with the corresponding displays "FRESH", "REC", "DEF", "HEAT", "HEAT/R" and "VENT".

In operation, no display is provided in the "OFF" position of the fan switch 53 since no current is supplied from the battery to the second to tenth lamps 641 to 649. However, the illuminating lamp 650 is only energized when the lighting switch L.S is turned on.

Suppose that the fan switch 53 is placed in one of the "L", "M" and "H" positions, the change-over lever 51 is kept in the "DEF" position, the heater lever 52 is kept in the "OFF" position, the internal-external air lever 57 is kept in the "RECIRC" position, and the cooler switch 58 is not turned on. In such a case, the second brush 632 is in electrical contact with the second electrode plate 636, and the movable arm of heater switch 630 is in contact with contact b. Consequently, current supplied from the battery flows through the fan switch 53, second electrode plate 636, second brush 632, tenth lamp 649 and diode $D_{12}$ to be supplied to the contact b of heater switch 630, thence, to the flickering circuit 65. The tenth lamp 649 emits flickering blue light which passes through the display "DEF" in the shielding plate 613 and then through the smoked panel 612 to reach the display penel 611. Thus, the display "DEF" is displayed on the display panel 611 with flickering blue light which is readily sensed by the eyes of the occupant. Due to, further, the fact that the internal-external air switch 570 is connected at its contact a with the fan switch 53, the fourth lamp 643 is also energized to emit flickering blue light which passes through the display "REC" and then through the smoked panel 612 to reach the display panel 611. Thus, this display "REC" is displayed on the display panel 611 with flickering blue light which is readily visible to the eyes of the occupant. The operation is similar to that above described when the cooler switch 58 is turned on.

Then, when the internal-external air lever 57 is moved to the "FRESH" position from the "RECIRC" position, the movable arm of internal-external air switch 570 is brought into contact with the contact b to deenergize the fourth lamp 643 and energize the second lamp 641 in turn, with the result that the display "FRESH" is displayed on the display panel 611 with flickering blue light.

When the heater lever 52 is then moved from the "OFF" position toward the "HOT" position in the state in which the internal-external air lever 57 is placed in the "RECIRC" or "FRESH" position, the movable arm of heater switch 630 is brought into contact with the contact a to deenergize the tenth lamp 649. Since the cooler switch 58 is in its "OFF" position and the relay 580 is in its closed state, the ninth lamp 648 is energized to emit flickering red light which passes through the display "DEF" and then through the smoked panel 612 to reach the display panel 611. Thus, the display "DEF" is displayed on the display panel 611 with flickering red light. In this case, the display "REC" or "FRESH" is also displayed on the display panel 611 with flickering blue light.

When the cooler switch 58 is turned on with the internal-external air lever 57 kept in the "RECIRC" position and the heater lever 52 kept in the position moved from the "OFF" position, the cooler relay 580 is opened to deenergize the ninth lamp 648.

Table 3 shows the luminant display modes of the display patterns when the heater lever 52 and cooler switch 58 are manipulated in the positions A, B, C, D and E of the change-over lever 51.

Table 3

| Fan Switch & Cooler Switch Position | Display Pattern | Change-Over Lever Position Heater Lever Position | Def A Off | Def A Except Off | Between Def And Heat B Off | Between Def And Heat B Except Off | Heat C Off | Heat C Except Off | Between Heat And Vent D Off | Between Heat And Vent D Except Off | Vent E Off | Vent E Except Off |
|---|---|---|---|---|---|---|---|---|---|---|---|---|
| Fan Switch Except Off, Cooler Switch On | Def | | L | — | L | — | — | — | — | — | — | — |
| | Heat | | — | — | — | L | — | L | — | L | — | — |
| | Heat/R | | | | | | | | | | | |
| | Vent | | — | — | — | — | — | — | — | L | L | L | L |
| Fan Switch Except Off, Cooler Switch Off | Def | | L | R | L | R | — | — | — | — | — | — |
| | Heat | | | | | | | | | | | |
| | Heat/R | | — | — | L | R | L | R | L | R | — | — |
| | Vent | | — | — | — | — | — | — | L | L | L | L |

REMARKS:
1. Symbol "—" indicates that patterns are not displayed. Symbols "L" and "R" represent blue and red displays respectively.
2. None of display patterns are displayed in off position of fan switch.

The display "FRESH" and "REC" are displayed on the display panel 611 only when the internal-external air lever 57 is placed in its "FRESH" and "RECIRC" position.

It will be understood from the foregoing description of the third embodiment that the occupant can easily visually confirm the flow of air into and out of the air conditioner proper 1 and also the discharge of warm air or cold air merely looking at the display panel 611. The disposition of the display patterns on the back side of the smoked panel 612 improves the visibility of the display patterns since such patterns are visible to the eyes of the occupant only when the associated lamps are energized. Further, the occupant can easily see the display panel 611 when he manipulates the air conditioner actuator 5 since the display panel 611 is disposed adjacent to this actuator 5.

Figure 18B:
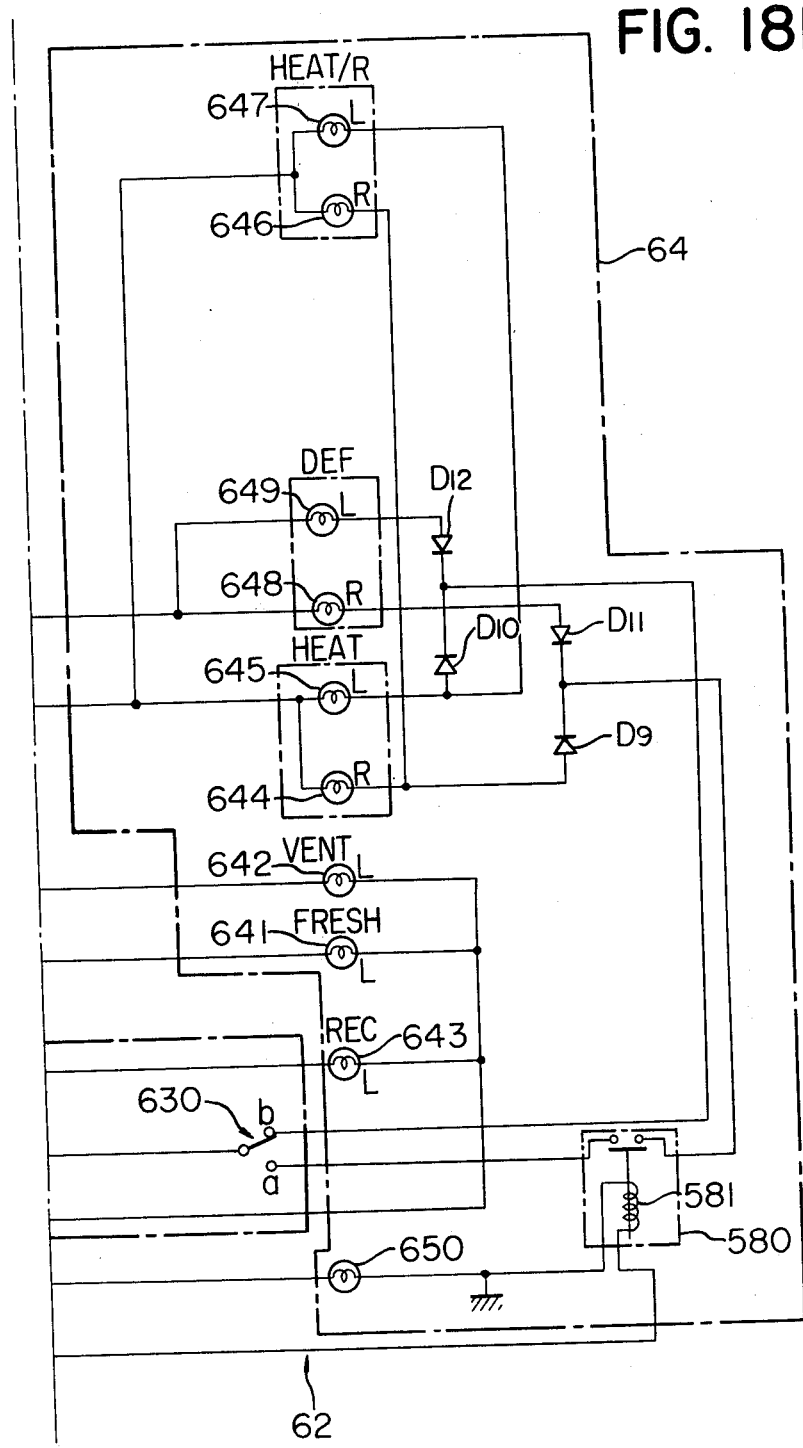
FIG. 18B is the right portion of a circuit diagram of a control section in the third embodiment.

The second electrode plate 636 and internal-external air switch 570 in FIG. 18 may be connected with the terminal IG of vehicle's ignition key switch instead of being connected with the fan switch 53, so that the second to tenth lamps 641 to 649 can be energized when the ignition key switch is in its IG position. The luminant display modes of the display patterns in such a modification are similar to those shown in Table 3.

The fourth lamp 643 in the third embodiment may be a red-emitting lamp. The use of such a lamp is preferable since the display "REC" is displayed on the display panel 611 with flickering red light whenever the cooler is in operation, and this manner of display matches well with the actual operating mode of the air conditioner.

In the third embodiment, the profiles 611' of the front glass, bonnet, instrument panel and driver have been depicted on the back face of the display panel 611 with a readily visible color such as white. However, V-shaped grooves defining the profiles 611' may be formed on the back face of the display panel 611, and the illuminating lamp 650 may be connected with the terminal IG of vehicle's ignition key switch, fan switch 53 and vehicle speed detector switch 637 so that it may be energized whenever the display device 6 is placed in operation.

Figure 28:
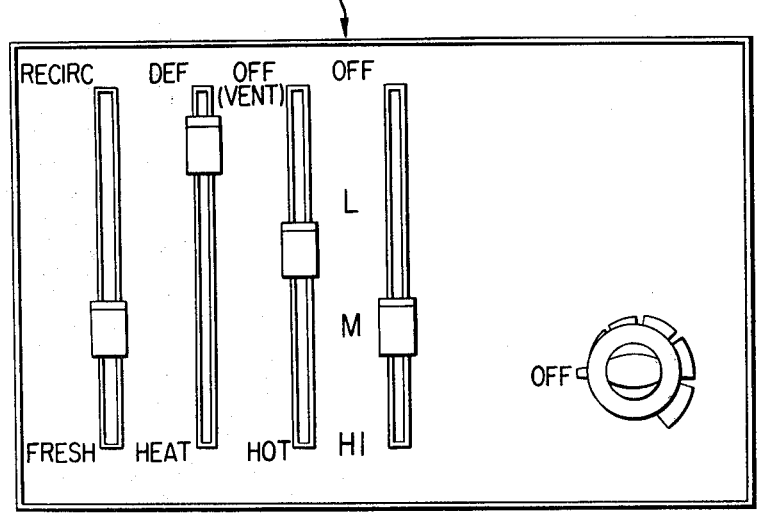
FIG. 28 is a front elevational view of a preferred form of the air conditioner actuator used in the arrangement shown in FIG. 20.
Figure 19:
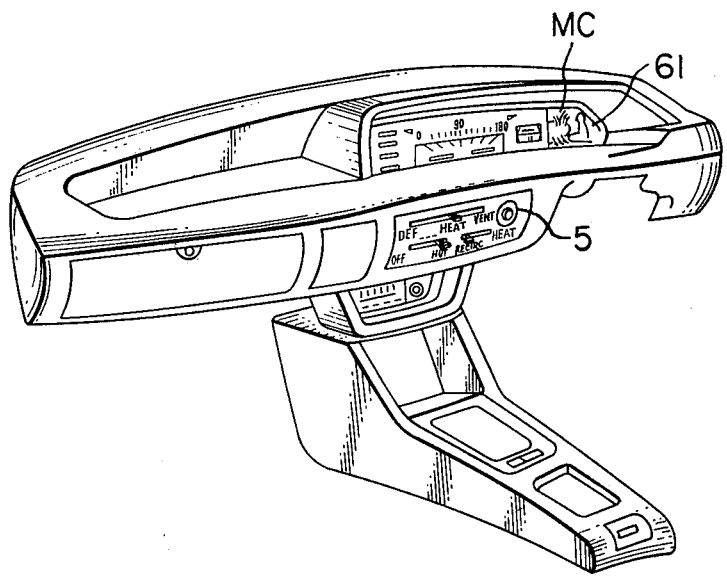
FIG. 19 is a perspective view of a modified arrangement of the air conditioner actuator and display section.
Figure 20:
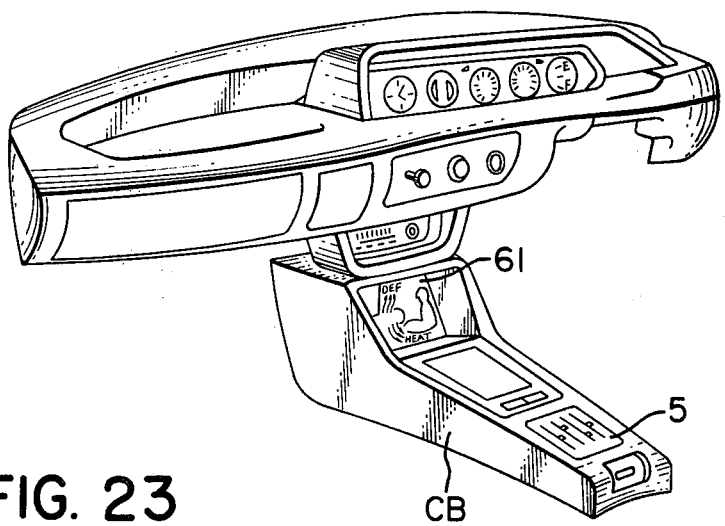
FIG. 20 is a perspective view of another modified arrangement of the air conditioner actuator and display section.

Further, although the display section 61 of the display device 6 has been disposed adjacent to the air conditioner actuator 5 in the third embodiment, this display section 61 may be disposed adjacent to the meter cluster MC as shown in FIG. 19, or it may be disposed at the front end portion of the center console box C.B, and the air conditioner actuator 5 may be disposed at the rear end portion of the center console box C.B as shown in FIG. 20. In such a case, the air conditioner actuator 5 may be of a type as shown in FIG. 28 so that it may be conveniently operated.

In lieu of the slide switch structure consisting of the second electrode plate 636 and brushes 632, 633 and 634 in the third embodiment, a sealed slide switch may be employed.

Further, the flickering circuit 65 used in the third embodiment may be replaced by the light intensity attenuating circuit 69 shown in FIG. 11.

Figure 23:
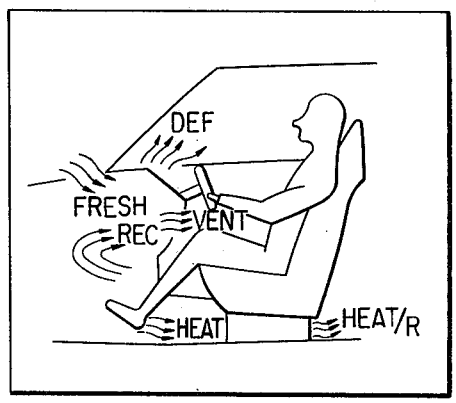
FIG. 23 is a front elevational view of a display section in the fourth embodiment.
Figure 21:
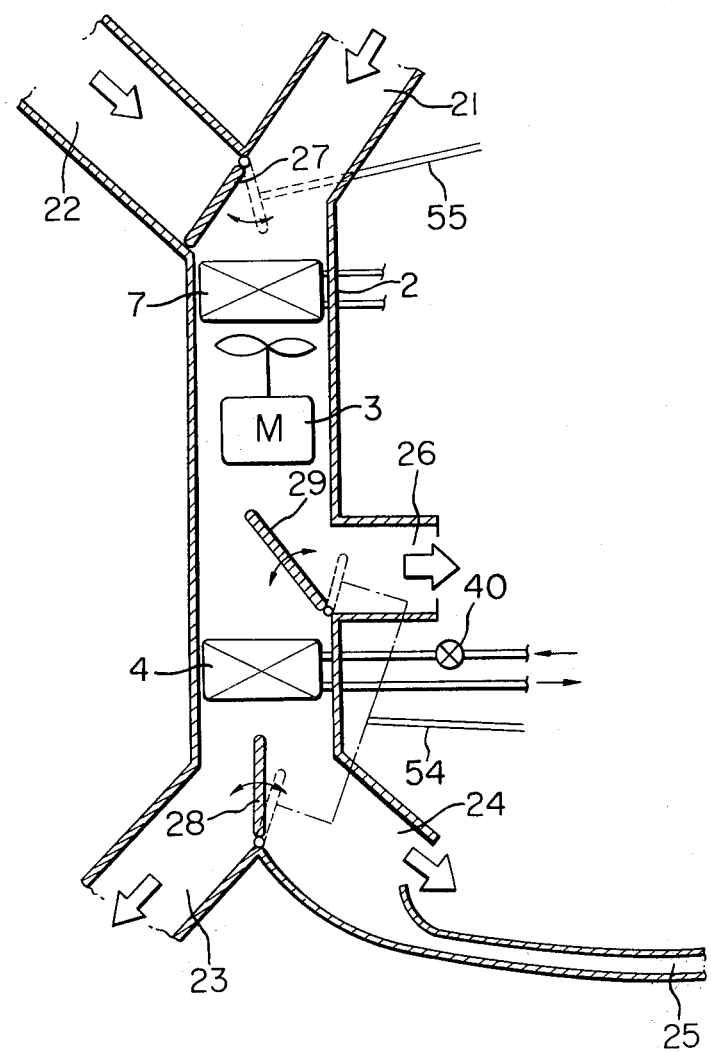
FIG. 21 illustrates part of an conditioner proper associated with a fourth embodiment of the present invention.

FIGS. 21 to 23 show a fourth embodiment, or a modification of the third embodiment, of the present invention, in which the cooler evaporator 7 is disposed in the air duct 2 between the first damper 27 and the fan unit 3, and the displays "FRESH" and "REC" are displayed on the display panel 611 with blue light and red light.

In this fourth embodiment, the second lamp 641 and an eleventh lamp 641' are disposed in the space behind the display "FRESH", and the fourth lamp 643 and a twelfth lamp 643' are disposed in the space behind the display "REC". The second lamp 641 is connected at one terminal thereof with the stationary contact a of internal-external air switch 570 and at the other terminal thereof with a stationary contact a of a third switch 580''' of cooler relay 580 through a diode. The eleventh lamp 641' is connected at one terminal thereof with the contact a of internal-external air switch 570 and at the other terminal thereof with another contact b of third switch 580''' through another diode. The fourth lamp 643 is connected at one terminal thereof with the contact b of internal-external air switch 570 and at the other terminal thereof with the contact a of third switch 580''' through another diode. The twelfth lamp 643' is connected at one terminal thereof with the contact b of internal-external air switch 570 and at the other terminal thereof with the contact b of third switch 580''' through another diode. The second and fourth lamps 641 and 643 emit blue light, and the eleventh and twelfth lamps 641' and 643' emit red light. The cooler relay 580 includes a first to a third switch 580', 580'' and 580''' in each of which its movable arm is brought into contact with stationary contacts b and a when an exciting coil 581 of relay 580 is energized and deenergized respectively. The first switch 580' is connected at its contact a with the contact a of heater switch 630. The second switch 580'' is connected at its movable arm with the sixth and tenth lamps 645 and 649. The contact a of second switch 580'' is connected with the contact b of heater switch 630, and the contact b is connected with the terminal X of flickering circuit 65. The third switch 580''' is connected at its movable arm with the terminal X of flickering circuit 65.

When the internal-external air level 57 is placed in the "FRESH" position, and the heater lever 52 is placed in the "OFF" position, while the cooler switch 58 is kept in the "OFF" position, the movable arm of internal-external air switch 570 is brought into contact with the contact a, and the movable arm of heater switch 630 is brought into contact with the contact b, while the movable arm of third switch 580''' of cooler relay 580 is brought into contact with the contact a.

Consequently, the second lamp 641 is energized to display the display "FRESH" on the display panel 611 with flickering blue light.

The movable arm of internal-external air switch 570 is brought into contact with the contact b when the internal-external air lever 57 is shifted to the "RECIRC" position. The fourth lamp 643 is energized to provide flickering blue light display of the display "REC" on the display panel 611.

When the cooler switch 58 is then turned on in the above state, the cooler relay 580 is energized to bring the movable arm of third switch 580''' into contact with the contact b. Consequently, the fourth lamp 643 is deenergized, and the twelfth lamp 643' is energized in turn to provide flickering red light display of the display "REC" on the display panel 611.

Then, when the internal-external air lever 57 is restored to the "FRESH" position, the movable arm of internal-external air switch 570 is brought into contact with the contact a. Consequently, the twelfth lamp 643' is deenergized, and the eleventh lamp 641' is energized in turn to provide flickering red light display of the display "FRESH" on the display panel 611.

Therefore, the displays "FRESH" and "REC" displaying the flowing patterns of air into the air conditioner proper 1 are displayed on the display panel 611 with flickering red light when the cooler is in operation, and although not described, the displays "HEAT", "DEF" and "VENT" displaying the flowing patterns of cold air from the air conditioner proper 1 are displayed on the panel 611 with flickering blue light. Such manner of display matches well with the actual operating state of the air conditioner.

Figure 24:
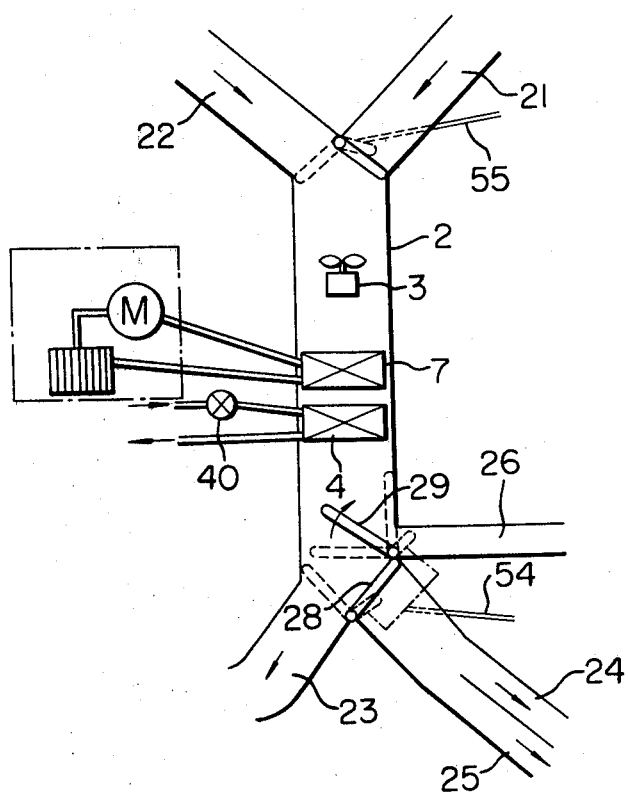
FIG. 24 illustrates part of an air conditioner proper associated with a fifth embodiment of the present invention.
Figure 25A:
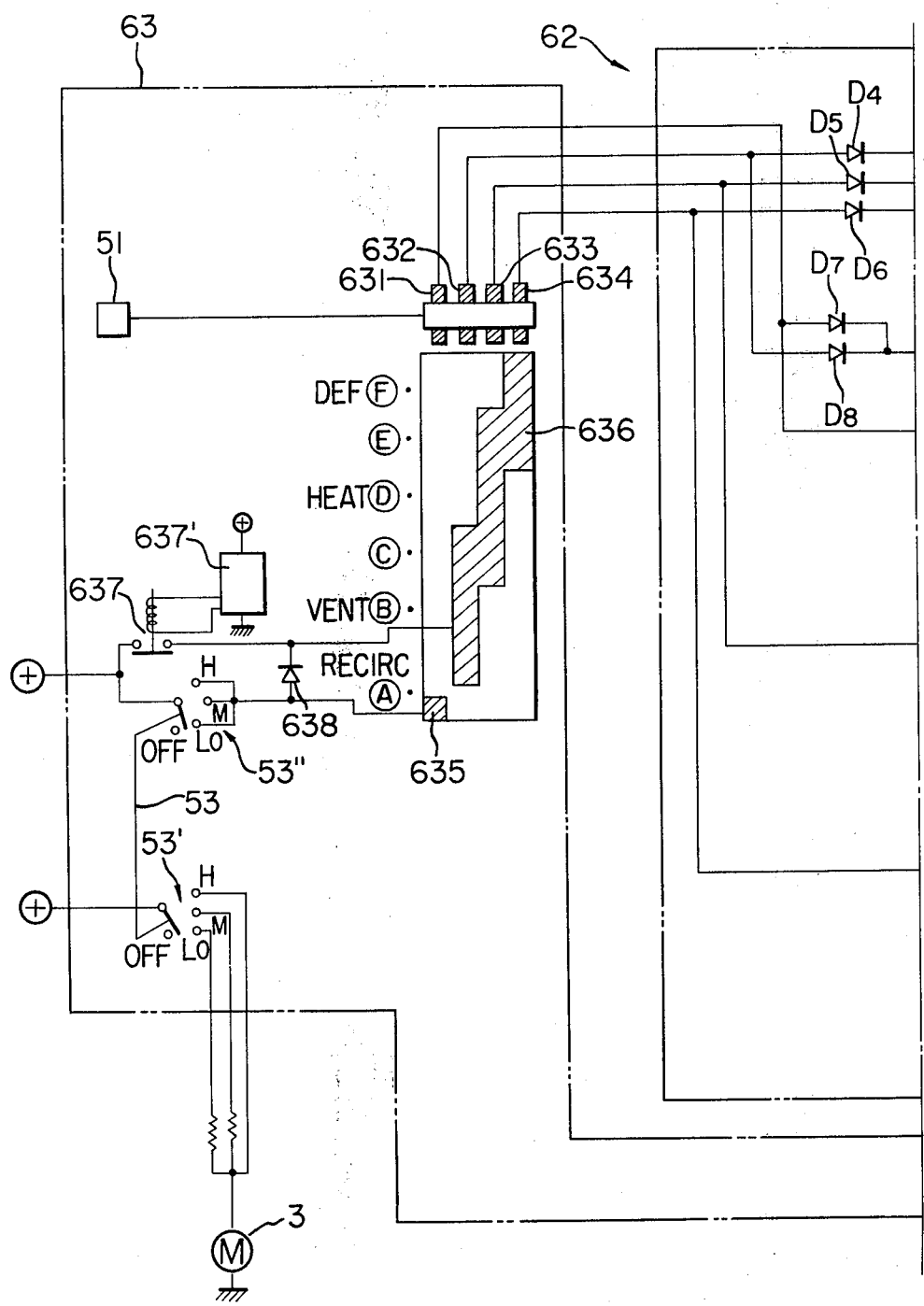
FIG. 25A is the left protion of a circuit diagram of a control section in the fifth embodiment.

FIGS. 24 and 25 show a fifth embodiment, or a modification of the first embodiment, of the present invention. Thus, the same reference numerals are used to denote the same parts appearing in FIGS. 1 to 10. In this fifth embodiment, a red-emitting thirteenth lamp 642′ is disposed on the back side of the display "VENT" in addition to the blue-emitting third lamp 642 in the first embodiment, and the blue-emitting lamps and red-emitting lamps disposed on the back side of the displays "VENT", "HEAT", "HEAT/R" and "DEF" are simultaneously energized when the heater and the cooler are simultaneously operated so as to illuminate these displays with purple light.

Referring to FIGS. 24 and 25, the cooler evaporator 7 is disposed in the air duct 2 between the fan unit 3 and the heater core 4, and the ventilation air discharge duct 26 is arranged to open into the air duct 2 between the heater core 4 and the second damper 28. The third damper 29 is disposed in the position in which it selectively opens and closes the ventilation air discharge duct 26 and air duct 2. The relay 630 includes a first switch 630″ and a second switch 630‴ actuated in response to the energization and deenergization of the relay's exciting coil 630′. The blue-emitting third lamp 642 disposed on the back side of the display "VENT" is connected at one terminal thereof with diodes D7 and D8 and at the other terminal thereof with the stationary contact b of second switch 630‴ through a diode. The red-emitting thirteenth lamp 642′ disposed also on the back side of the display "VENT" is connected at one terminal thereof with the diodes D7 and D8 and at the other terminal thereof with the stationary contact a of second switch 630‴ through a diode. The fifth and seventh lamps 644 and 646 disposed on the back side of the displays "HEAT" and "HEAT/R" respectively are connected with the stationary contact a of second switch 630‴ through a diode, and the sixth and eighth lamps 645 and 647 disposed also on the back side of the displays "HEAT" and "HEAT/R" respectively are connected with the stationary contact b of second switch 630‴ through a diode. The movable arms of first and second switches 630″ and 630‴ are connected with the terminal X of flickering circuit 65. The contacts b of these switches 630″ and 630‴ are connected with the cooler switch 58 through diodes respectively, and the cooler switch 58 is connected with the terminal X of flickering circuit 65. In this embodiment, the fourth lamp 643 emits red light.

When the change-over lever 51 is moved to the position B labeled "VENT" in the "OFF" position of the heater lever 52 and in the "OFF" position of the cooler switch 58, the second brush 632 engages with the second electrode plate 636, and since the heater switch 639 is turned off, the movable arm of second switch 630‴ in the relay 630 is brought into contact with the contact b to supply current from the battery to the third lamp 642 and connect this lamp 642 with the terminal X of flickering circuit 65. Consequently, the third lamp 642 is energized to illuminate the display "VENT" with flickering blue light.

Then, when the heater lever 52 is moved from the "OFF" position toward the "HOT" position, the exciting coil 630′ of relay 630 is energized to actuate the first and second switches 630″ and 630‴ thereby bringing the movable arm of second switch 630‴ into contact with the contact a. The third lamp 642 is deenergized, and the thirteenth lamp 642′ is energized in turn to illuminate the display "VENT" with flickering red light.

Then, when the cooler switch 58 is turned on, the third lamp 642 is energized as it is connected with the cooler switch 58 through the diodes. At this time, the thirteenth lamp 642′ is kept still in the energized state. As a result, the display "VENT" is illuminated with purple light which is the mixture of red light and blue light.

Table 4 shows the color display modes of the displays "DEF", "VENT", "HEAT", "HEAT/R", "REAR VENT", "FRESH" and "REC" depending on the positions of the change-over lever 51, heater lever 52, fan switch 53 and cooler switch 58 and also depending on the speed of the vehicle.

Table 4

| Operating Conditions | Display Lamp | Heater Lever Position | Change-over Lever Position Recirc A | | Vent B | | Between Vent And Heat C | | Heat D | | Between Heat And Def E | | Def F | |
|---|---|---|---|---|---|---|---|---|---|---|---|---|---|---|
| | | | Off | Except Off | Off | Except Off | Off | Except Off | Off | Except Off | Off | Except Off | Off | Except Off |
| Fan Switch Off, Vehicle Speed Higher than 10km/hr | Def | | — | — | — | — | — | — | — | — | L | R | L | R |
| | Vent | | — | — | L | R | L | R | — | — | — | — | — | — |
| | Heat | | — | — | — | — | L | R | L | R | L | R | — | — |
| | Heat/R | | — | — | — | — | L | R | L | R | L | R | — | — |
| | — | | — | L | L | L | L | L | L | L | L | L | L | L |
| Rear | Vent Fresh | | — | — | L | L | L | L | L | L | L | L | L | L |
| Fan Switch Except Off, Cooler Switch Off | Recirc | | — | — | — | — | — | — | — | — | — | — | — | — |
| | Def | | — | — | — | — | — | — | — | — | L | R | L | R |
| | Vent | | L | R | L | R | L | R | — | — | — | — | — | — |
| | Heat | | — | — | — | — | L | R | L | R | L | R | — | — |
| | Heat/R | | — | — | — | — | L | R | L | R | L | R | — | — |
| | Rear Vent Fresh | | — | — | L | L | L | L | L | L | L | L | L | L |
| | Recirc | | R | R | — | — | — | — | — | — | — | — | — | — |
| Coller Switch On, Fan Switch Except | Def | | — | — | — | — | — | — | — | — | L | L·R | L | L·R |
| | Vent | | L | L·R | L | L·R | L | L·R | — | — | — | — | — | — |
| | Heat | | — | — | — | — | L | L·R | L | L·R | L | L·R | — | — |
| | Heat/R | | — | — | — | — | L | L·R | L | L·R | L | L·R | — | — |

Table 4-continued

| Operating Conditions | Display Lamp | Change-over Lever Position Heater Lever Position | Recirc A Off | Except Off | Vent B Off | Except Off | Between Vent And Heat C Off | Except Off | Heat D Off | Except Off | Between Heat And Def E Off | Except Off | Def F Off | Except Off |
|---|---|---|---|---|---|---|---|---|---|---|---|---|---|---|
| Off | Rear Vent | | — | — | L | L | L | L | L | L | L | L | L | L |
| | Fresh | | — | — | L | L | L | L | L | L | L | L | L | L |
| | Recirc | | R | R | — | — | — | — | — | — | — | — | — | — |

REMARKS:
1. Symbol "—" indicates that lamps are not energized. Symbols "L", "R" and "L · R" represent blue display, red display, and purple display respectively.
2. None of lamps except illuminating lamp are energized when vehicle speed is lower than 10km/hr and fan switch is off.

It will therefore be seen that, when the heater and the cooler are simultaneously operated, the blue-emitting lamps and red-emitting lamps are simultaneously energized to illuminate the displays "VENT", "HEAT", "HEAT/R" and "DEF" with purple light, so that the occupant can readily visually confirm that warm air from the heater and cold air from the cooler are being discharged in mixed relation. In this fifth embodiment, the fourth lamp 643 emits red light instead of blue light. Thus, when the cooler is operated in the "RECIRC" position of the change-over lever 51, the display "REC" is illuminated with red light, and the display "VENT" is illuminated with blue light. This manner of color display matches well with the actual operating mode of the air conditioner.

In the fifth embodiment, the fourth lamp 643 may emit blue light instead of red light.

The structure of the display section 61 in this fifth embodiment is similar to that shown in FIG. 17 illustrating the third embodiment.

Figure 26:
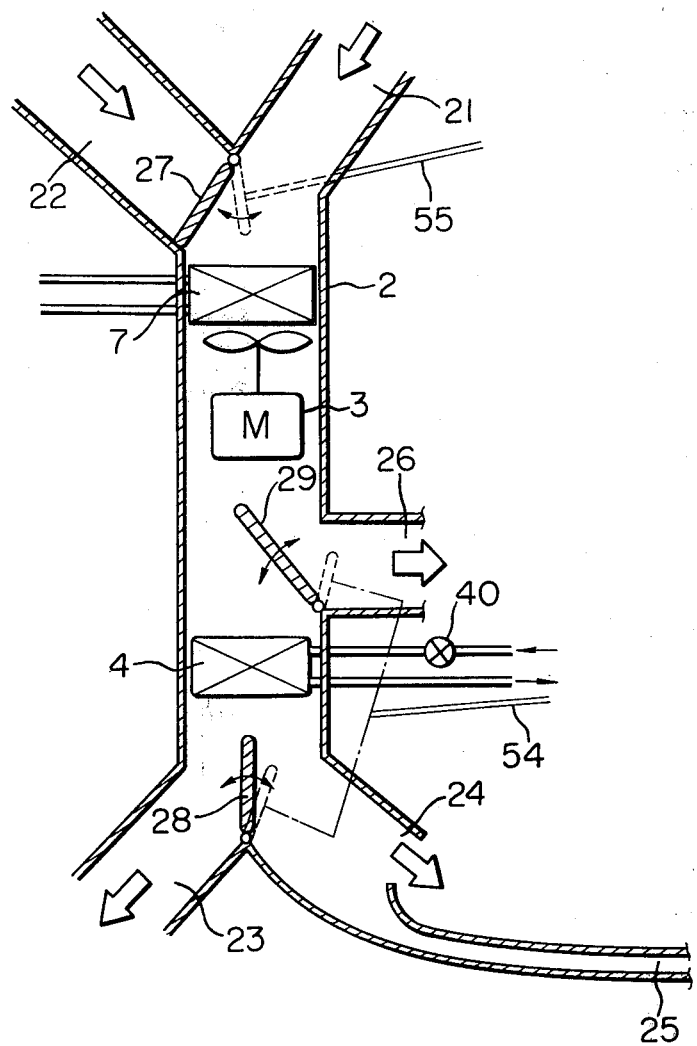
FIG. 26 illustrates part of an air conditioner proper associated with a sixth embodiment of the present invention.
Figure 27B:
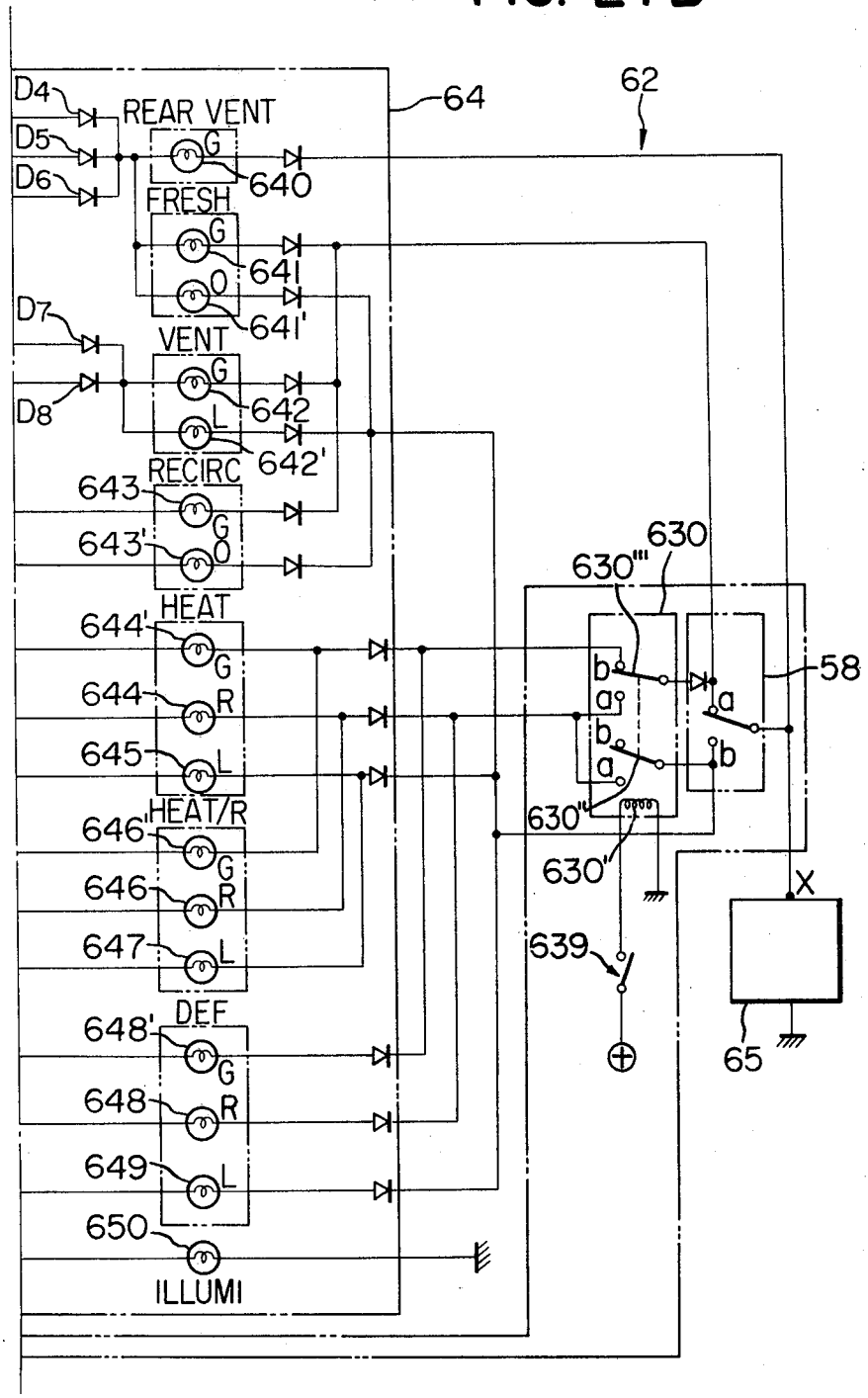
FIG. 27B is the right portion of a circuit diagram of a control section in the sixth embodiment.

FIGS. 26 and 27 show a sixth embodiment, or a modification of the fifth embodiment, of the present invention, and the same reference numerals are used to denote the same parts appearing in FIGS. 24 and 25. In this sixth embodiment, four colors are used for display.

Referring to FIGS. 26 and 27, the cooler evaporator 7 is disposed in the air duct 2 between the first damper 27 and the fan unit 3. The first lamp 640 illuminating the display "REAR VENT" emits green light and is connected with the terminal X of flickering circuit 65 through a diode. The second lamp 641 and eleventh lamp 641' disposed on the back side of the display "FRESH" emit green light and orange light respectively. The second lamp 641 is connected with the contact a of cooler switch 58 through a diode, and the eleventh lamp 641' is connected with the contact b of cooler switch 58 through a diode. The third lamp 642 and thirteenth lamp 642' disposed on the back side of the display "VENT" emit green light and blue light respectively. The third lamp 642 is connected with the contact a of cooler switch 58 through a diode, and the thirteenth lamp 642' is connected with the contact b of cooler switch 58 through a diode. The fourth lamp 643 and twelfth lamp 643' disposed on the back side of the display "REC" emit green light and orange light respectively. The fourth lamp 643 is connected with the contact a of cooler switch 58 through a diode, and the twelfth lamp 643' is connected with the contact b of cooler switch 58 through a diode. The fifth lamp 644, sixth lamp 645 and fourteenth lamp 644' disposed on the back side of the display "HEAT" emit red light, blue light and green light respectively. The fifth lamp 644 is connected with the contacts a of first and second switches 630" and 630''' in the relay 630 through a diode, and the sixth lamp 645 is connected with the contact b of cooler switch 58 through a diode. The fourteenth lamp 644' is connected with the contact b of second switch 630''' in the relay 630 through a diode. The seventh lamp 646, eighth lamp 647 and fifteenth lamp 646' disposed on the back side of the display "HEAT/R" emit red light, blue light and green light respectively. The seventh lamp 646 is connected in parallel with the fifth lamp 644, and the eighth lamp 647 is connected in parallel with the sixth lamp 645. The fifteenth lamp 646' is connected in parallel with the fourteenth lamp 644'. The ninth lamp 648, tenth lamp 649 and sixteenth lamp 648' disposed on the back side of the display "DEF" emit red light, blue light and green light respectively. The ninth lamp 648 is connected with the contacts a of first and second switches 630" and 630''' in the relay 630 through a diode, and the tenth lamp 649 is connected with the contact b of cooler switch 58 through a diode. The sixteenth lamp 648' is connected with the contact b of second switch 630''' through a diode. The first switch 630" of relay 630 is connected with the contact b of cooler switch 58, and the second switch 630''' of relay 630 is connected with the contact a of cooler switch 58. The movable arm of cooler switch 58 is brought into contact with the contact a when turned off and with the contact b when turned on.

Suppose that the vehicle is running at a speed higher than 10 km/hr with the change-over lever 51 placed in the position C intermediate the "VENT" and "HEAT" positions, the heater lever 52 kept in the "OFF" position and the cooler switch 58 turned off. Then, the second electrode plate 636 is engaged by the second and third brushes 632 and 633. Since the vehicle speed detector switch 637 is turned on and the heater switch 639 is turned off, the movable arms of first and second switches 630" and 630''' in the relay 630 are brought into contact with the contacts b, and the movable arm of cooler switch 58 is in contact with the contact a. Consequently, the first, second, third, fourteenth and fifteenth lamps 640, 641, 642, 644' and 646' are energized to illuminate the displays "REAR VENT", "FRESH", "VENT", "HEAT" and "HEAT/R" with green light. All these lamps are deenergized when the vehicle speed is reduced to less than 10 km/hr. When the fan switch 53 is placed in one of the "L", "M" and "H" positions at a vehicle speed lower than 10 km/hr, the displays "REAR VENT", "FRESH", "VENT", "HEAT" and "HEAT/R" are illuminated with green light as in the above case.

When the fan switch 53 is placed in the "ON" position, or when the heater lever 52 is moved from the "OFF" position toward the "HOT" position at a vehicle speed higher than 10 km/hr, external air is discharged from the outlet 26' of ventilation air discharge duct 26, and warm air is discharged from the outlets 24' and 25' of foot air discharge ducts 24 and 25. Since the heater switch 639 is turned on, the movable arms of first and second switches 630" and 630'" in the relay 630 are now in contact with the contacts a. Consequently, the first, second, third, fifth and seventh lamps 640, 641, 642, 644 and 646 are energized to illuminate the displays "REAR VENT", "FRESH" and "VENT" with green light and the displays "HEAT" and "HEAT/R" with red light.

Then, when the cooler switch 58 is turned on, the movable arm of cooler switch 58 is brought into contact with the contact b. Consequently, the second and third lamps 641 and 642 are deenergized, and the eleventh and thirteenth lamps 641' and 642' are energized in turn, while the first lamp 640 remains in the energized state. Also, the fifth, sixth, seventh and eighth lamps 644, 645, 646 and 647 are energized. Consequently, the display "REAR VENT" is illuminated with green light, the display "FRESH" is illuminated with orange light, the display "VENT" is illuminated with blue light, and the displays "HEAT" and "HEAT/R" are illuminated with purple light which is the mixture of red light and blue light.

When the heater lever 52 is then restored to the "OFF" position, the heater switch 639 is turned off to bring the movable arms of first and second switches 630" and 630'" in the relay 630 into contact with the contacts b. Consequently, the fifth and seventh lamps 644 and 646 are deenergized, while the sixth and eighth lamps 645 and 647 remain in the energized state. In this case, the displays "HEAT" and "HEAT/R" are illuminated with blue light.

Table 5 shows the color display modes of the displays "DEF", "VENT", "HEAT", "HEAT/R", "FRESH", "REAR VENT" and "REC" depending on the positions of the change-over lever 51, heater lever 52, fan switch 53, cooler switch 58 and vehicle speed detector switch 670.

Table 5

| Operating Conditions | Display Lamp | Heater Lever Position | Recirc A Off | Recirc A Except Off | Vent B Off | Vent B Except Off | Between Vent And Heat C Off | Between Vent And Heat C Except Off | Heat D Off | Heat D Except Off | Between Heat And Def E Off | Between Heat And Def E Except Off | Def F Off | Def F Except Off |
|---|---|---|---|---|---|---|---|---|---|---|---|---|---|---|
| Running With Fan Switch Off Cooler Switch Off | Def | | — | — | — | — | — | — | — | — | G | R | G | R |
| | Vent | | — | — | G | G | G | G | — | — | — | — | — | — |
| | Heat | | — | — | — | — | G | R | G | R | G | R | — | — |
| | Heat/R | | — | — | — | — | G | R | G | R | G | R | — | — |
| | Fresh · Vent | | — | — | G | G | G | G | G | G | G | G | G | G |
| | Recirc | | — | — | — | — | — | — | — | — | — | — | — | — |
| Fan Switch Except Off, Cooler Switch Off | Def | | — | — | — | — | — | — | — | — | G | R | G | R |
| | Vent | | G | G | G | G | G | G | — | — | — | — | — | — |
| | Heat | | — | — | — | — | G | R | G | R | G | R | — | — |
| | Heat/R | | — | — | — | — | G | R | G | R | G | R | — | — |
| | Fresh · Rear Vent | | — | — | G | G | G | G | G | G | G | G | G | G |
| | Recirc | | G | G | — | — | — | — | — | — | — | — | — | — |
| Cooler Switch On, Fan Switch Except Off | Def | | — | — | — | — | — | — | — | — | L | L·R | L | L·R |
| | Vent | | L | L | L | L | L | L | — | — | — | — | — | — |
| | Heat | | — | — | — | — | L | L·R | L | L·R | L | L·R | — | — |
| | Heat/R | | — | — | — | — | L | L·R | L | L·R | L | L·R | — | — |
| | Fresh | | — | — | O | O | O | O | O | O | O | O | O | O |
| | Recirc | | O | O | — | — | — | — | — | — | — | — | — | — |
| | Rear Vent | | — | — | G | G | G | G | G | G | G | G | G | G |

Remarks:
1. Symbol "—" indicates that lamps are not energized. Symbols "G", "R", "L", "O" and "L · R" represent green display, red display, blue display, orange display and purple display respectively.
2. None of lamps except illuminating lamp are energized when vehicle speed is lower than 10 km/hr and fan switch is off.

It will therefore be seen that the display "FRESH" is illuminated with orange light when the cooler or both the cooler and the heater are in operation and with green light when the cooler is not in operation. This matter of color display matches well with the actual operating mode of the air conditioner. Also, the displays "VENT", "HEAT", "HEAT/R" and "DEF" are illuminated with blue light when the cooler only is in operation. Further, the displays "HEAT", "HEAT/R" and "DEF" are illuminated with red light when the heater only is in operation, and with purple light which is the mixture of blue light and red light when both the cooler and the heater are in operation. Thus, the occupant can readily visually confirm the temperature of air being discharged into the compartment, that is, warm air, cold air or their mixture being discharged.

What is claimed is:

1. An air conditioning display system for a vehicle comprising a vehicle's air conditioner proper including at least a plurality of air intake ducts, a plurality of air discharge ducts, a plurality of dampers disposed in said ducts for closing and opening said ducts, and a fan unit, air conditioner actuating means for actuating at least said dampers and said fan unit in said air conditioner proper thereby regulating a temperature of air discharged out of said discharge ducts, and a display device mounted in said vehicle and including a display panel carrying the picture of the vehicle body portions including at least the front seat and its neighbourhood, said display device comprising a plurality of switch means selectively turned on and off for selectively energizing and deenergizing a plurality of lamps in response to the manipulation of said air conditioner actuating means, whereby said selectively energized lamps provide luminant display of the flowing patterns of air into and out of said air conditioner proper on the portions of said display panel corresponding to the vehicle body portions at which air flows into and out of said air conditioner proper, and temperature switch means for energizing lamps emitting light of cold color when cold air flows out from the duct outlets, and energizing lamps emitting light of warm color when warm air flows out from the duct outlets.

2. An air conditioning display system as claimed in claim 1, wherein said air conditioner actuating means includes a change-over lever selectively closing and opening said dampers in said air conditioner proper, and a heater lever shifted between the positions opening and closing the path of warm water toward a heater core in said air conditioner proper, and said display device includes a first lamp connected with a first switch turned on in the external air introducing position of said change-over lever for illuminating the display pattern displaying the introduction of external air into said air conditioner proper, a second lamp connected with a second switch turned on in the compartment air recirculating position of said change-over lever for illuminating the display pattern displaying the recirculation of air within the vehicle's compartment, a third lamp connected with a third switch turned on in the ventilation air discharging position of said change-over lever for illuminating the display pattern displaying the discharge of ventilation air toward the upper half of the body of an occupant, a fourth lamp emitting light of warm color and connected at one terminal thereof with a fourth switch turned on in the foot air discharging position of said change-over lever for illuminating the display pattern displaying the discharge of foot air toward the foot portion of an occupant, a fifth lamp emitting light of cold color and connected at one terminal thereof with said fourth switch for illuminating the display pattern displaying the discharge of foot air, a sixth lamp emitting light of warm color and connected at one terminal thereof with a fifth switch turned on in the defroster air discharging position of said change-over lever for illuminating the display pattern displaying the discharge of defroster air, a seventh lamp emitting light of cold color and connected at one terminal thereof with said fifth switch for illuminating the display pattern displaying the discharge of defroster air, and a heater switch having a movable arm, a first contact connected with the other terminals of said fourth and sixth lamps, and a second contact connected with the other terminals of said fifth and seventh lamps, said movable arm of said heater switch being brought into contact with said first contact when said heater lever is moved to the position at which warm water is substantially supplied to said heater core, and being brought into contact with said second contact when said heater lever is moved to the position at which warm water is not substantially supplied to said heater core.

3. An air conditioning display system as claimed in claim 2, wherein a vehicle speed detector switch is connected between said power source and said first, third, fourth and fifth switches to be turned on at a vehicle speed higher than a predetermined setting, and a fan switch is connected between said power source and said first, second, third, fourth and fifth switches.

4. An air conditioning display system as claimed in claim 3, wherein said first, second and third lamps and said heater switch are connected with a flickering circuit including means for providing an output voltage varying cyclically with time.

5. An air conditioning display system as claimed in claim 3, wherein said first, second and third lamps and said heater switch are connected with ground through a light intensity attenuating circuit including means for providing a large resistance value in the on position of the vehicle's lighting switch used for turning on and off the vehicle's head lamps and a resistance value smaller than the above value in the off position of the lighting switch.

6. An air conditioning display system as claimed in claim 2, wherein said second switch is composed of a first conductive brush mounted on said change-over lever and a first electrode plate disposed in said air conditioner actuating means, said third switch is composed of a second conductive brush mounted on said change-over lever and a second electrode plate disposed in said air conditioner actuating means, said fourth switch is composed of a third conductive brush mounted on said change-over lever and said second electrode plate disposed in said air conditioner actuating means, and said fifth switch is composed of a fourth conductive brush mounted on said change-over lever and said second electrode plate disposed in said air conditioner actuating means, said first lamp being connected with said second, third and fourth brushes, and said third lamp being connected with said first and second brushes.

7. An air conditioning display system as claimed in claim 6, wherein said first electrode plate is connected with a fan switch, and said second electrode plate is connected with said power source through said fan switch and a vehicle speed detector switch which is turned on at a vehicle speed higher than a predetermined setting.

8. An air conditioning display system as claimed in claim 6, wherein said first and second electrode plates are connected with the terminal IG of the vehicle's ignition key switch.

9. An air conditioning display system as claimed in claim 2, further comprising a cooler switch disposed in said air conditioner actuating means to be turned on to permit supply of a refrigerant to a cooler evaporator disposed in said air conditioner proper, and a relay capable of energizing said fifth and seventh lamps when said heater switch is turned off and said cooler switch is turned on, energizing said fourth and sixth lamps when said heater switch is turned on and said cooler switch is turned off, and energizing said fourth, fifth, sixth and seventh lamps when both said heater switch and said cooler switch are turned on.

10. An air conditioning display system as claimed in claim 9, wherein said relay includes a movable arm brought into contact with a first stationary contact and a second stationary contact when said heater switch is turned on and off respectively, said first contact of said relay being connected with said fourth and sixth lamps, and said second contact of said relay being connected with said fifth and seventh lamps and said cooler switch.

11. An air conditioning display system as claimed in claim 10, wherein said second lamp emits light of warm color.

12. An air conditioning display system as claimed in claim 10, wherein said third lamp emitting light of cold color is connected at one terminal thereof with the second contact of said relay, and a tenth lamp emitting light of warm color for illuminating the display pattern displaying the discharge of ventilation air is connected at one terminal thereof with the other terminal of said third lamp and at the other terminal thereof with the first contact of said relay.

13. An air conditioning display system as claimed in claim 2, further comprising a cooler switch disposed in said air conditioner actuating means to be turned on to permit supply of a refrigerant to a cooler evaporator disposed in said air conditioner proper, and eleventh lamp emitting light of color between cold color and warm color for illuminating the display pattern displaying the discharge of foot air, a twelfth lamp emitting light of color between cold color and warm color for illuminating the display pattern displaying the discharge of defroster air, and a relay capable of energizing said eleventh and twelfth lamps when both said heater switch and said cooler switch are turned off, energizing said fifth and seventh lamps when said heater switch is turned off and said cooler switch is turned on, energizing said fourth and sixth lamps when said heater switch is turned on and said cooler switch is turned off, and energizing said fourth, fifth, sixth and seventh lamps when both said heater switch and said cooler switch are turned on.

14. An air conditioning display system as claimed in claim 13, wherein said relay includes a first switch and a second switch each having a movable arm brought into contact with a first stationary contact and a second stationary contact when said heater switch is turned on and off respectively, said first and second switches being connected at their first contacts with said fourth and sixth lamps, said second switch being connected at its second contact with said eleventh and twelfth lamps, said fifth and seventh lamps and the movable arm of said first switch being connected with the second contact of said cooler switch engaged by the movable arm when the cooler is in operation, and the movable arm of said second switch being connected with the first contact of said cooler switch engaged by the movable arm when the cooler is not in operation.

15. An air conditioning display system as claimed in claim 14, wherein said first lamp emits light of relatively cold color and is connected with the first contact of said cooler switch, an eighth lamp emits light of relatively warm color for illuminating the display pattern displaying the introduction of external air and is connected with the second contact of said cooler switch, said second lamp emits light relatively cold color and is connected with the first contact of said cooler switch, a ninth lamp emits light of relatively warm color for illuminating the display pattern displaying the recirculation of air within the vehicle's compartment and is connected with the second contact of said cooler switch, said third lamp emits light of relatively cold color and is connected with the first contact of said cooler switch, and a tenth lamp emits light of cold color for illuminating the display pattern displaying the discharge of ventilation air and is connected with the second contact of said cooler switch, whereby said first, second and third lamps can be energized when the cooler is not in operation, and said eighth, ninth and tenth lamps can be energized when the cooler is in operation.

16. An air conditioning display system as claimed in claim 15, wherein said first, second, third, eleventh and twelfth lamps emit green light, said fourth and sixth lamps emit red light, said fifth, seventh and tenth lamps emit blue light, and said eighth and ninth lamps emit orange light.

17. An air conditioning display system as claimed in claim 2, wherein a change-over lever is provided in said air conditioner actuating means for selectively closing and opening said dampers in said air conditioner proper, and said display device includes a plurality of electrode plates carried by said change-over lever, and a plurality of brushes provided in said air conditioner actuating means to be connected with said lamps, said brushes being selectively engaged by said electrode plates depending on the position of said change-over lever thereby energizing the associated ones of said lamps.

18. An air conditioning display system as claimed in claim 1, wherein said air conditioner actuating means includes an internal-external air lever for operating the damper to selectively closing and opening the external air intake duct and the compartment air intake duct of said air conditioner proper, a change-over lever for operating the dampers to selectively closing and opening the ventilation air discharge duct for discharging the ventilation air toward the upper half of the body of an occupant, the defroster air discharge duct and the foot air discharge duct in said air conditioner proper, a heater lever shifted between the positions opening and closing the path of warm water toward a heater core in said air conditioner proper, and a cooler switch provided for the on-off of a cooler in said air conditioner proper, and said display device includes a first lamp connected with an internal-external air switch changed over in response to the operation of said internal-external air lever for illuminating the display pattern displaying the introduction of external air into said air conditioner proper in the external air introducing position of said internal-external air lever, a second lamp connected with said internal-external air switch for illuminating the display pattern displaying the recirculation of air within the vehicle's compartment in the compartment air recirculating position of said internal-external air lever, a third lamp connected with a third switch turned on in the ventilation air discharging position of said change-over lever for illuminating the display pattern displaying the discharge of ventilation air, a fourth lamp emitting light of warm color and connected at one terminal thereof with a fourth switch turned on in the foot air discharging position of said change-over lever for illuminating the display pattern displaying the discharge of foot air toward the foot portion of an occupant, a fifth lamp emitting light of cold color and connected at one terminal thereof with said fourth switch for illuminating the display pattern displaying the discharge of foot air, a sixth lamp emitting light of warm color and connected at one terminal thereof with a fifth switch turned on in the defroster air discharging position of said change-over lever for illuminating the display pattern displaying the discharge of defroster air, a seventh lamp emitting light of cold color and connected at one terminal thereof with said fifth switch for illuminating the display pattern displaying the discharge of defroster air, and a heater switch having a movable arm, a first contact connected with the other terminals of said fourth and sixth lamps, and a second contact connected with the other terminals of said fifth and seventh lamps, said movable arm of said heater switch being brought into contact with said first contact when said heater lever is moved to the position at which warm water is substantially supplied to said heater core, and being brought into contact with said second contact when said heater lever is moved to the position at which warm water is not substantially supplied to said heater core, said fourth and sixth lamps being connected with the first contact of said heater switch through a relay responsive to the on-off of said cooler switch, whereby said fourth and sixth lamps for illuminating said display patterns displaying the discharge of foot air and defroster air respectively are deenergized when both the heater and the cooler are simultaneously operated.

19. An air conditioning display system as claimed in claim 18, wherein said third switch is composed of a first conductive brush mounted on said change-over lever and an electrode plate disposed in said air conditioner actuating means, said fourth switch is composed of a second conductive brush mounted on said change-over lever and said electrode plate disposed in said air conditioner actuating means, and said fifth switch is composed of a third conductive brush mounted on said change-over lever and said electrode plate disposed in said air conditioner actuating means.

20. An air conditioning display system as claimed in claim 19, wherein said electrode plate and said internal-external air switch are connected with a fan switch.

21. An air conditioning display system as claimed in claim 19, wherein said heater switch and said first, second and third lamps are connected with a flickering circuit including means for providing an output voltage varying cyclically with time.

22. An air conditioning display system as claimed in claim 19, wherein said first, second and third lamps and said heater switch are connected with ground through a light intensity attenuating circuit including means for providing a large resistance value in the on position of the vehicle's lighting switch used for turning on and off the vehicle's head lamps and a resistance value smaller than the above value in the off position of the lighting switch.

23. An air conditioning display system as claimed in claim 19, wherein a light intensity attenuating circuit including means for providing a large resistance value in the on position of the vehicle's lighting switch used for turning on and off the vehicle's head lamps and a resistance value smaller than the above value in the off position of the lighting switch is connected between a fan switch and the connection point of said electrode plate and said internal-external air switch.

24. An air conditioning display system as claimed in claim 18, wherein said third, fourth and fifth switches and said internal-external air switch are connected with a fan switch.

25. An air conditioning display system as claimed in claim 18, wherein said third, fourth and fifth switches and said internal-external air switch are connected with the vehicle's ignition key switch.

26. An air conditioning display system as claimed in claim 18, wherein said first, second and third lamps emit light of cold color.

27. An air conditioning display system as claimed in claim 18, wherein said first and third lamps emit light of cold color, and said second lamp emits light of warm color.

28. An air conditioning display system as claimed in claim 18, wherein said relay can energize said fifth and seventh lamps when said heater switch is turned off and said cooler switch is turned on, energize said fourth and sixth lamps when said heater switch is turned on and said cooler switch is turned off, and energize said fifth and seventh lamps when both said heater switch and said cooler switch are turned on.

29. An air conditioning display system as claimed in claim 28, wherein said relay includes a first switch, a second switch and a third switch each having a movable arm brought into contact with a first stationary contact and a second stationary contact when said cooler switch is turned off and on respectively, said first switch being connected at its movable arm with said fourth and sixth lamps and at its first contact with a first stationary contact of said heater switch, said second switch being connected at its movable arm with said fifth and seventh lamps, at its first contact with a second stationary contact of said heater switch, and at its second contact with ground through said flickering circuit, said third switch being connected at its movable arm with ground through said flickering circuit, at its first contact with one terminal of said first lamp emitting light of cold color, and at its second contact with one terminal of an eighth lamp emitting light of warm color and connected at its other terminal with the other terminal of said first lamp for illuminating the display pattern displaying the introduction of external air, whereby said first lamp is energized to illuminate the display pattern displaying the introduction of external air when the heater is in operation, said eighth lamp being energized to illuminate the display pattern displaying the introduction of external air when the cooler is in operation, and said fifth and seventh lamps can be energized when both the heater and the cooler are in operation.

30. An air conditioning display system as claimed in claim 29, wherein said second lamp emitting light of cold color is connected at one terminal thereof with the first contact of said third switch in said relay, the second contact of said third switch being connected with one terminal of a ninth lamp connected at the other terminal thereof with the other terminal of said second lamp and emitting light of warm color for illuminating the display pattern displaying the recirculation of air within the vehicle's compartment.

31. An air conditioning display system as claimed in claim 1, wherein said picture of the vehicle body portions includes at least those of the instrument panel, front glass and bonnet depicted on said display panel, and said display device includes a smoked panel disposed on the back side of said display panel, a shielding plate disposed on the back face of said smoked panel, a plurality of display patterns formed by cutting out a plurality of portions of said shielding plate, a partition member partitioning the back space of said shielding plate into a plurality of independent spaces, and a plurality of lamps disposed in said independent spaces to be selectively energized, whereby the flow of air into and out of said air conditioner proper is readily visibly displayed by said display patterns on said display panel.

32. An air conditioning display system as claimed in claim 31, wherein said picture of said vehicle body portions are provided by V-shaped grooves formed on said display panel, and an illuminating lamp is disposed on one side of said display panel to illuminate said picture with light emitted from said lamp.

33. An air conditioning display system as claimed in claim 31, wherein said lamps are covered with caps of desired colors.

* * * * *